(12) United States Patent
Vogel et al.

(10) Patent No.: US 7,234,160 B2
(45) Date of Patent: Jun. 19, 2007

(54) METHOD AND APPARATUS FOR AUTHORIZING THE TRANSFER OF INFORMATION

(75) Inventors: Robert Vogel, Alpharetta, GA (US); Daniel Franz, Alpharetta, GA (US); Robert Klingenberg, Alpharetta, GA (US); Dave Barnes, Alpharetta, GA (US); Chris Schenken, Alpharetta, GA (US)

(73) Assignee: United Parcel Services of America, Inc., Atlanta, GA (US)

( * ) Notice: Subject to any disclaimer, the term of this patent is extended or adjusted under 35 U.S.C. 154(b) by 977 days.

(21) Appl. No.: 09/858,328

(22) Filed: May 15, 2001

(65) Prior Publication Data

US 2002/0035684 A1    Mar. 21, 2002

Related U.S. Application Data

(60) Provisional application No. 60/233,862, filed on Sep. 20, 2000.

(51) Int. Cl.
*H04L 9/32* (2006.01)
(52) U.S. Cl. ............................ 726/10; 713/185; 726/28
(58) Field of Classification Search ................ 713/200, 713/185; 726/5, 9, 10, 28; 705/3
See application file for complete search history.

(56) References Cited

U.S. PATENT DOCUMENTS

| 5,325,294 A | * | 6/1994 | Keene ............................ 705/3 |
| 5,481,720 A | | 1/1996 | Loucks et al. |
| 5,554,842 A | * | 9/1996 | Connell et al. ............. 235/491 |
| 5,706,427 A | | 1/1998 | Tabuki |
| 5,841,970 A | | 11/1998 | Tabuki |
| 5,869,819 A | * | 2/1999 | Knowles et al. ............. 235/375 |
| 5,884,272 A | * | 3/1999 | Walker et al. .................. 705/1 |
| 5,898,780 A | | 4/1999 | Liu et al. |
| 5,899,983 A | | 5/1999 | Hussmann |
| 5,903,721 A | | 5/1999 | Sixtus |
| 5,987,232 A | | 11/1999 | Tabuki |
| 5,996,076 A | | 11/1999 | Rowney et al. |

(Continued)

OTHER PUBLICATIONS

UPS, "UPS OnLine Tracking Information", version 1.3, May 18, 1998, pp. 1-4, obtained from http://web.archive.org/web/19980518023040/ups.com/using/software/online/oltrack_info.html.*

Henriksson et al., Security vs. Plug-and-Play for Operation and Maintenance, May 2000, pp. 9-14, obtained from http://epubl.luth.se/1402-1617/2000/139/LTU-EX-00139-SE.pdf.*

(Continued)

*Primary Examiner*—Emmanuel L. Moise
*Assistant Examiner*—Jeffrey D. Popham
(74) *Attorney, Agent, or Firm*—Alston & Bird LLP

(57) ABSTRACT

The present invention includes the use of at least three separate parties, a First Party, a Second Party, and a Third Party, with the First Party holding First Party Information, and the Third Party having an interest in Third Party Information held by the Second Party. The First Party requests to access Third Party Information held by the Second Party. The First Party's request is forwarded from the Second Party to the Third Party and is accompanied by some form of authorization information. Authorization is provided to the First Party by the Third Party by the transfer of the authorization information from the Third Party to said First Party, which authorizes the First Party to obtain the Third Party Information from the Second Party. Although at least three parties can be involved, two of these parties could be the same.

30 Claims, 22 Drawing Sheets

U.S. PATENT DOCUMENTS

| | | | |
|---|---|---|---|
| 6,011,858 A * | 1/2000 | Stock et al. | 382/115 |
| 6,070,243 A | 5/2000 | See et al. | |
| 6,073,106 A * | 6/2000 | Rozen et al. | 705/3 |
| 6,131,090 A | 10/2000 | Basso, Jr. et al. | |
| 6,157,924 A * | 12/2000 | Austin | 707/10 |
| 6,226,744 B1 * | 5/2001 | Murphy et al. | 726/5 |
| 6,246,994 B1 * | 6/2001 | Wolven et al. | 705/14 |
| 6,602,185 B1 * | 8/2003 | Uchikubo | 600/118 |
| 6,609,198 B1 * | 8/2003 | Wood et al. | 713/155 |
| 6,754,665 B1 * | 6/2004 | Futagami et al. | 707/102 |
| 6,845,448 B1 * | 1/2005 | Chaganti et al. | 713/166 |

OTHER PUBLICATIONS

Parsons Technology Inc. "Power of Attorney", Sep. 9, 1998, pp. 1-5, obtained from http://web.archive.org/web/19991012123139/http://lectlaw.com/filesh/qfl04.htm.*

Zimmerman et al., "Building an Intranet with Windows NT 4", Aug. 1996, contents (pp. 1-7), pertinent chapters 2 (pp. 1-17) and 10 (pp. 1-10), obtained from http://www.vanwijk.com/-=%20Bookz%20=-/Building%20An%20Intranet%20With%20Windows%20Nt%204/.*

\* cited by examiner

*Can happen at any time

RELATIONSHIPS

Fig. 8

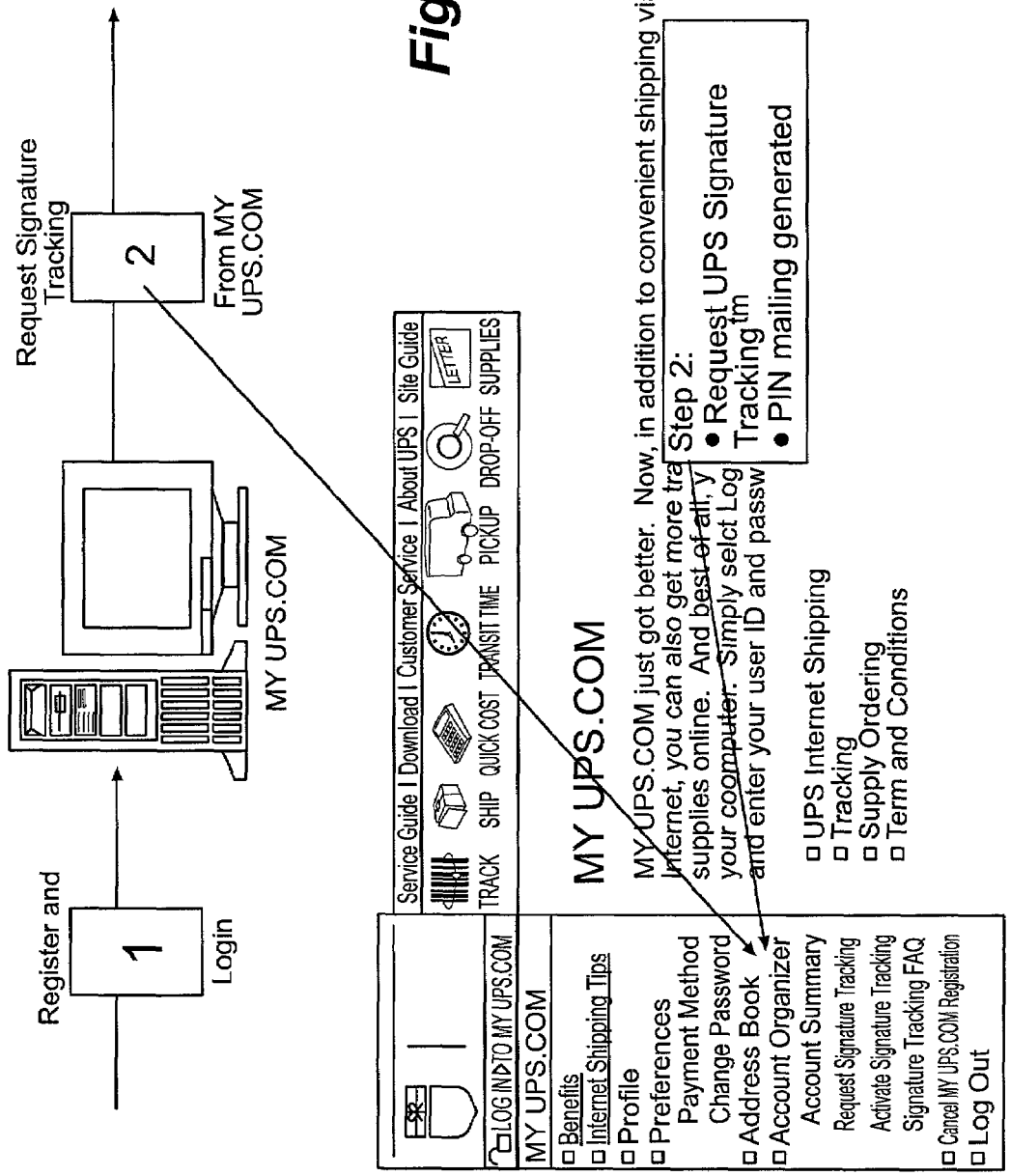

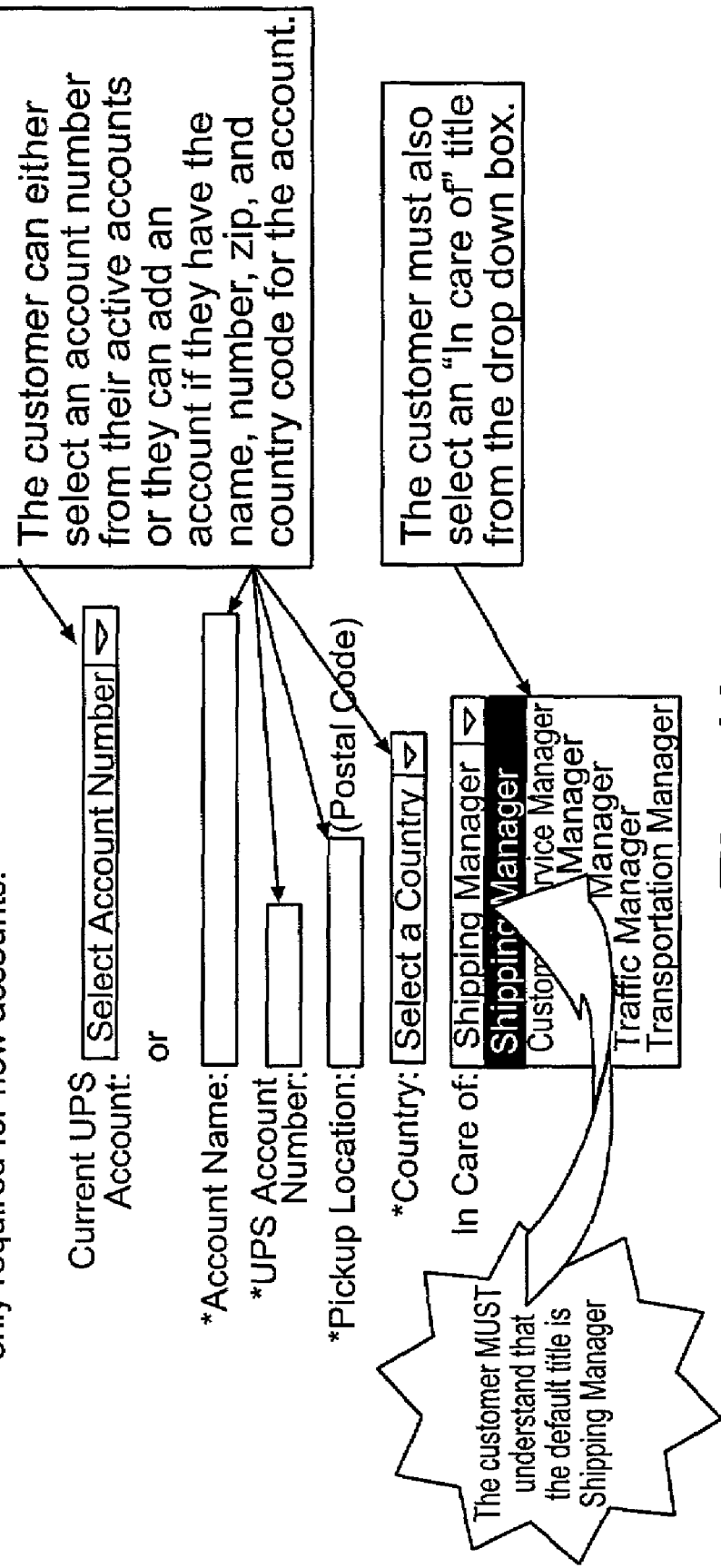

REQUEST TRACKING PRIVILEGES

As a member of MY UPS>COM you are entitled to special Tracking Privileges available for packages shipped with your UPS account.

Select one of the UPS accounts currently in your profile or enter new UPS account information in the spaces provided.

A letter with your Personal Identification Number to activate these privileges will be mailed to the attention of the individual designated in the 'in care of' box below.

UPS ACCOUNT INFORMATION

Required fields are shown in bold. Fields marked with an asterisk are only required for new accounts.

Current UPS Account: [Select Account Number ▽]

or

*Account Name: [_____]
*UPS Account Number: [_____]
*Pickup Location: [_____] (Postal Code)
*Country: [Select a Country ▽] [▷]
In Care of: [_____]

[Submit] [Cancel]

MY UPS.COM
- Benefits
- Tips
- Profile
- Preferences
- Payment Method
- Change Password
- Address Book
- Cancel MY UPS>COM Registration
- Log Out August 23, 2000

*Fig. 11*

PIN Letter (one mailing, two parts):

Shipper's Representative:

[Corporate Customer]
Attn: [Pre-defined from pull-down menu]
[CRIS address]
[CRIS address line 2]
[CRIS city, state, zip]

Dear Valued Customer:

[Requester's first and last name]
    [Requester's title]
    [Requester's company]
    [Requester's street address]
    [Requester's address city, state, postal code]
    [Requester's phone number]
    [Requester's e-mail address]

has requested the right to see privileged [tracking] Information (which may include [full delivery address, reference numbers, signature image and C.O.D. information]) for packages shipped under your UPS account number [6-digit account number].

If you wish to grant this access to privileged [tracking] information, please forward this individual the Personal Indentification Number (PIN). You'll find the PIN in the enclosed PIN REQUEST GRANTED form.

If you have questions about privileged [tracking] information, please visit our Web site at www.ups.com or contact your UPS Account Executive.

Thank you for choosing UPS to help with your shipping needs. We look forward to continually providing innovative ways to track and ship your packages.

United Parcel Service

Requestor:

[Requester's first and last name]
[Requester's title]
[Requester's company]
[Requester's street address]
[Requester's address city, state, postal code]

Dear MY UPS.COM User:

Your request to see privileged tracking information for UPS account number [6-digit account number] has been granted by the account owner. To activate your PIN [8-digit] for this UPS account number, visit www.ups.com, then Log in to your MY UPS.COM account and click the View > MY UPS.COM button.
    On the MY UPS.COM Profile page, select the PIN Confirmation link.
    Enter the PIN and UPS account number in the appropriate fields on the PIN Confirmation page.

After the PIN Confirmed page appears, the additional information for which you have been approved with be accessible Thank you for shipping with UPS.

United Parcel Service

UPS Signature Tracking™
Activate

7442 PIN NUMBER OR UPS ACCT NUMBER IS INCORRECT

*This is the error message they will receive!*

UPS Account Number: 327000

Personal Identification Number: **********

[Submit]

MY UPS.COM
- Benefits
- Internet Shipping Tips
- Profile
- Preferences
- Payment Method
- Change Password
- Address Book
- Account Organizer
- Account Summary
- Request Signature Tracking
- Signature tracking FAQ
- Cancel MY UPS>COM
- Registration
- Log Out Service Guide | Download | Customer Service | About UPS | Site Guide

TRACK  SHIP  QUICK COST  TRANSIT TIME  PICKUP  DROP-OFF  SUPPLIES

Home | Track | Ship | Quick Cost | Transit Time | Pickup | Drop-off | Supplies | Service Guide | Download | Customer Service | About UPS | MY UPS.COM

*Fig. 18*

UPS Signature Tracking™ Confirmation

The UPS Signature Tracking features listed below

- Full Delivery Address Information
- COD Information
- Reference Number
- Electronic Signature The sensitive delivery information listed will now display when tracking packages using their MY UPS.COM ID.

The above information will now be automatically in Results page while logged in to MY UPS.com usin Account Name: UPS
UPS Acct. No.: 327000

The activated shipper number and account name display.

MY UPS.COM
- Benefits
- Internet Shipping Tips
- Profile
- Preferences
  Payment Method
  Change Password
- Address Book
- Account Organizer
  Account Summary
  Request Signature Tracking
  Signature tracking FAQ
- Cancel MY UPS>COM Registration
- Log Out Activate another PIN

*Fig. 19*

METHOD AND APPARATUS FOR AUTHORIZING THE TRANSFER OF INFORMATION

CROSS-REFERENCE TO RELATED APPLICATIONS

The present application claims the full benefit and priority of pending provisional application No. 60/233,862, filed Sep. 20, 2000, entitled Method and Apparatus for Authorizing the Transfer of Information." The entirety of this provisional application is incorporated by reference.

FIELD OF THE INVENTION

The present invention relates generally to transfer of information, and particularly relates to the management delivery of privileged information.

BACKGROUND OF THE INVENTION

The personal delivery of items such as parcels has long been known in the art. As an example, United Parcel Service (a.k.a. "UPS") the assignee of the present application, ships nearly 13 million packages and documents each day through a network, which has been carefully engineered to provide speed, reliability, and efficiency. The first step in the process is pickup. UPS delivery drivers are assigned a specific route, making regularly scheduled stops along the route. Typically, the driver delivers packages in the morning, and picks up packages in the afternoon. Large-volume customers, who might ship thousands of packages a day, may have a UPS tractor-trailer stationed on site. Lower-volume customers, who might ship as few as 2–5 packages a week, are served by the familiar UPS delivery truck. Customers with urgent shipments of Next Day Air letters or packages can call UPS for On-Call Air Pick Up. Using state-of-the-art communications technology, On-Call Air dispatchers locate the nearest package car and electronically dispatch it to the customer location for "just in time" pickup. Occasional customers can drop off their packages at conveniently located UPS letter centers and service counters.

To transport packages most efficiently, UPS has developed an elaborate network of "hubs" or central sorting facilities located throughout the world. Each hub is "fed" by a number of local operating centers, which serve as home base for UPS pickup and delivery vehicles. Packages from the local operating center are transported to the hub, usually by tractor-trailer and are unloaded. The packages are sorted by ZIP code and consolidated on conveyor belts. Packages bound for a specific geographical region are all consolidated on the same conveyor belt. Then packages are routed to either an out-bound trailer for local delivery, or to a delivery truck serving the immediate area. Before being loaded, each package is checked one last time, just to make sure it has been sorted correctly.

To transport packages between hubs, UPS uses tractor-trailers, called feeders, to transport thousands of packages from the hub where the package originated, to the hub nearest the package's destination. This is known as the ground feeder network.

Each UPS driver delivers up to 500 packages a day, including express packages which must be delivered by 10:30 a.m. This process requires careful planning and teamwork. At the hub, packages are loaded onto delivery trucks in the same order in which they will be delivered. This process is called the "preload." By delivering packages in sequence, from one address to the next closest address, drivers complete their assigned routes as quickly and productively as possible. In 1991, UPS became the first package delivery company to gather signatures electronically and have Saturday Delivery. Using a hand-held computer device called a DIAD (Delivery Information Acquisition Device), the driver electronically captures information about each package, including the time of delivery and even the signature of the person receiving the package.

As may be understood, the delivery of such items requires a significant investment in logistics, not only to perform the delivery service but to provide the customer with information regarding the items while they are in transit, a.k.a. "online tracking". In 1994, UPS's Web site made its debut and for the first time in UPS history, on Dec. 22, 1998, online tracking requests for www.ups.com exceeded one million. At the time of filing of this application, UPS was delivering approximately 12.9 million packages and documents a day for 1.8 million regular customers and averages more than two million on-line tracking requests per day on its Web site.

Although such tracking features indeed have advantages, the need for improvements always exists.

SUMMARY OF THE INVENTION

The present invention overcomes deficiencies in the prior art by providing a password or "PIN"-based system for managing delivery of privileged or "enhanced" information, which utilizes "third-party" authorization. this concept may be used in conjunction with parcel delivery information but is also contemplated for use in other areas such as credit card information, personal records, etc.

In one embodiment this system includes the use of three separate parties, a First Party, a Second Party, and a Third Party. It should be understood that these three parties are all part of a cooperating relationship. This is to distinguish "unauthorized third parties", which are not part of the relationship and in fact are to be excluded.

The First Party initially "registers" with the Second Party by providing self-authenticating basic registration information. This registration provides the First Party with a first set of privileges.

The First Party may then ask for a PIN number (a.k.a. a "password") in order to obtain a second set of privileges to observe information held, controlled, or otherwise made available by the Second Party which is related to a Third Party. In requesting the PIN, the First Party must provide additional registration information to the Second Party relating to the Third Party, which the Second Party can authenticate. The Second Party then forwards the PIN request to the Third Party along with the First Party's basic registration information. The Third Party then can decide whether to forward the PIN to the First Party. If the PIN is so forwarded, the First Party then may use the PIN to gain the requested additional access privileges. The second set of privileges can be dynamically modified by the Third Party.

Therefore it is an object of the present invention to provide an improved information management system.

It is a further object of the present invention to provide an improved information management system which is effective.

It is a further object of the present invention to provide an improved information management system which is efficient.

It is a further object of the present invention to provide an improved information management system which is cost-effective.

It is a further object of the present invention to provide an improved information management system which can be used to manage information relating to parcels.

It is a further object of the present invention to provide an improved information management system which can be used to manage information relating to parcels in transit.

It is a further object of the present invention to provide an improved information management system which can be used to manage information relating to medical records.

It is a further object of the present invention to provide an improved information management system which can be used to manage information relating to personal records.

It is a further object of the present invention to provide an improved information management system which can be used to manage information relating to personnel records.

Other objects of the present invention will become apparent in reading the specification and claims.

BRIEF DESCRIPTION OF THE DRAWINGS

FIG. 8 is an illustrative view illustrating a web page which allows the customer to select an ID and a password. A "verification question" will also be provided as known in the art, if one forgets their password.

FIG. 9 is an illustrative view which shows Step 2 of the multi-step process of FIG. 5, as well as a part of the web page that allows UPS signature tracking to be requested such that and a PIN mailing is later generated. Upon requesting signature tracking, the customer is presented with terms and conditions of an agreement for signature tracking. The customer typically scrolls down this page (not shown) to accept the particular service agreement. The customer can also be directed to explanations of "UPS Signature Tracking", which is one embodiment of the invention. The customer must scroll down through this information in order to complete the PIN requesting information. In one embodiment access is provided to at least "Full Address Information", "COD Information", "Reference Number", and "Electronic Signature". It should also be noted that the shipper has the flexibility to turn off elements by user or for all users and by country.

FIG. 10 is a web page which illustrates how a customer can to select an account number from their active accounts, or they can add an account if they have the name, number, zip and country code for the account. The customer must also select an "in care of" title from the drop down box.

FIG. 11 is a more complete web page which includes the information as shown in FIG. 10.

FIG. 13 is an illustration of two letters, which form a single mailing. The first letter is a letter from UPS to the Shipper's representative, which advises that a Requestor has requested the right to see certain tracking information. It further advises the Shipper's representative that if the Shipper wishes to grant this access to privilege information, that a PIN should be forwarded in the enclosed PIN Request Granted form. The PIN Request Granted form is the second letter of the two, which is a letter from UPS to the requestor (which is to be passed along by the shipper) which includes the PIN.

FIG. 17 is another web page similar to FIG. 15, which allows for the requestor/user to activate UPS Signature Tracking by entering a PIN and the associated UPS account, and then pressing the Submit button. It is very important that the requestor/user understand that if they have multiple ID's, they must login using the ID that matches the shipper's number and the PIN. If not, they will receive an error message.

FIG. 18 is a copy of a subsequent web page which shows that an error message has been provided if the PIN number or UPS account number is incorrect.

FIG. 19 is an alternate subsequent web page which is shown if the correct PIN is used. The delivery information listed will now display when the customer is tracking packages using their MY UPS.COM ID. It should here be noted that the term Signature Tracking may be considered a trademark of applicant.

DETAILED DESCRIPTION OF THE INVENTION

As will be seen, the present application discusses various concepts which relate to the use of information. Many of these issues may relate to the use, processing, transfer, handling, passing on, or release of information which may or may not be considered to be sensitive, private, or personal. The proper treatment of such information should be addressed under the associated privacy laws or other similar laws (such laws vary widely according to the types of information and according to the various locales), and should not be limited or expanded Reference is now made to the drawings, in which like numerals indicate like elements throughout the several views.

General Operation

Generally described, the present invention provides a PIN-based mechanism for managing delivery of privileged information, which utilizes "third-party" authorization. In one embodiment this system includes the use of three separate parties, a First Party, a Second Party, and a Third Party. The First Party initially "registers" with the Second Party by providing self-authenticating basic registration information. This registration provides the First Party with a first set of privileges.

The First Party may then ask for a PIN number in order to obtain a second set of privileges to observe information provided by the Second Party which is related to a Third Party in some manner (e.g., personal information such as medical records). In requesting the PIN, the First Party must provide additional registration information to the Second Party relating to the Third Party, which the Second Party can authenticate. The Second Party then forwards the PIN request to the Third Party along with the First Party's basic registration information. The Third Party then can decide whether to forward the PIN to the First Party. If the PIN is so forwarded, the First Party then may use the PIN to gain the requested additional access privileges. The second set of privileges can be dynamically modified by the Third Party.

In one particular embodiment, the present invention provides a PIN-based mechanism for managing delivery of privileged parcel tracking information from a web site such as UPS.com. A Requester is the First Party, UPS is the Second Party, and a Shipper is the Third Party.

Figure 1:
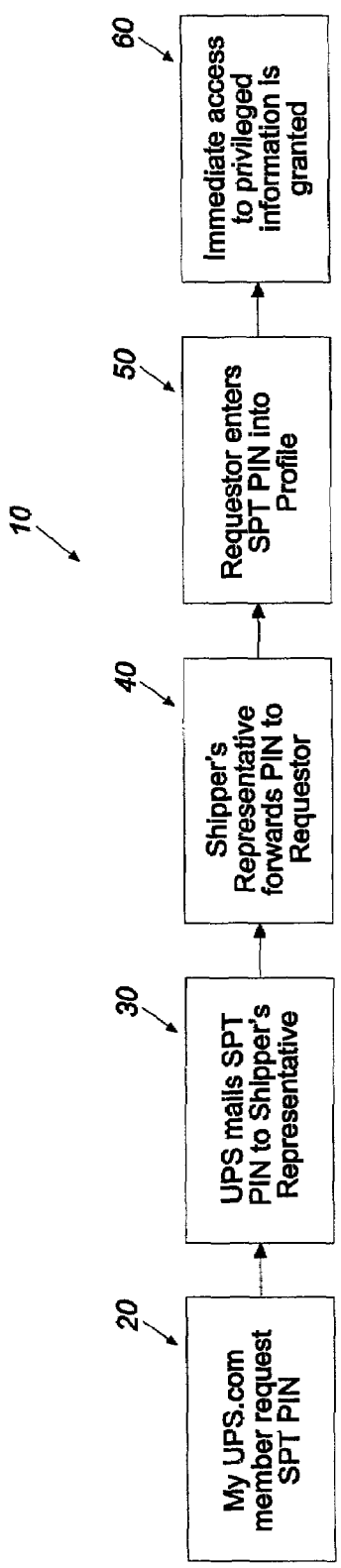
FIG. 1 is a flow chart disclosing various steps 20, 30, 40, 50, and 60 relating to the overall process 10 according to the present invention.

FIG. 1 is a flow chart disclosing various steps 20, 30, 40, 50, and 60 relating to the overall process 10 according to the present invention.

Figure 2:
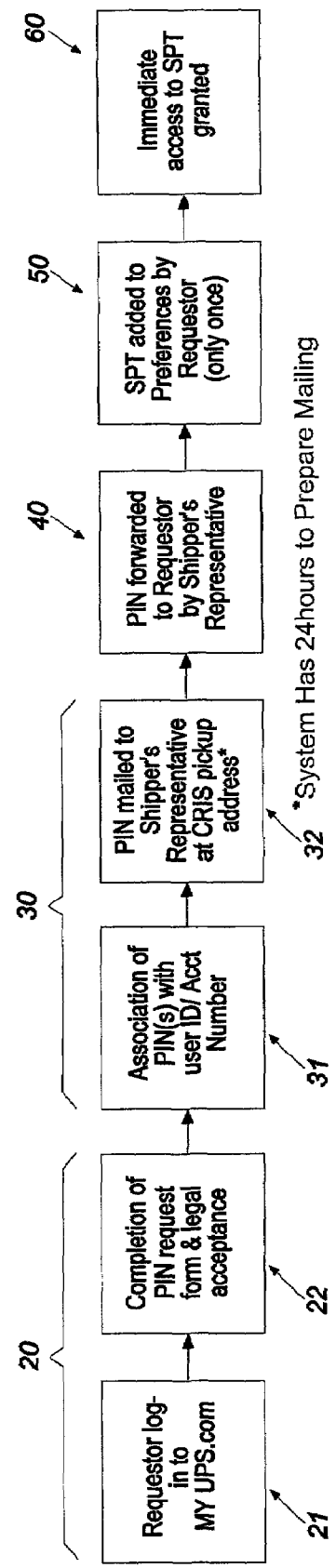
FIG. 2 is another flow chart illustrating an overall process according to the present invention, including step 20 (having substeps 21 and 22), step 30 (having substeps 31 and 32), steps 40, 50, and 60.

FIG. 2 is another flow chart illustrating an overall process according to the present invention, including step 20 (having substeps 21 and 22), step 30 (having substeps 31 and 32), steps 40, 50, and 60.

Figure 3A:
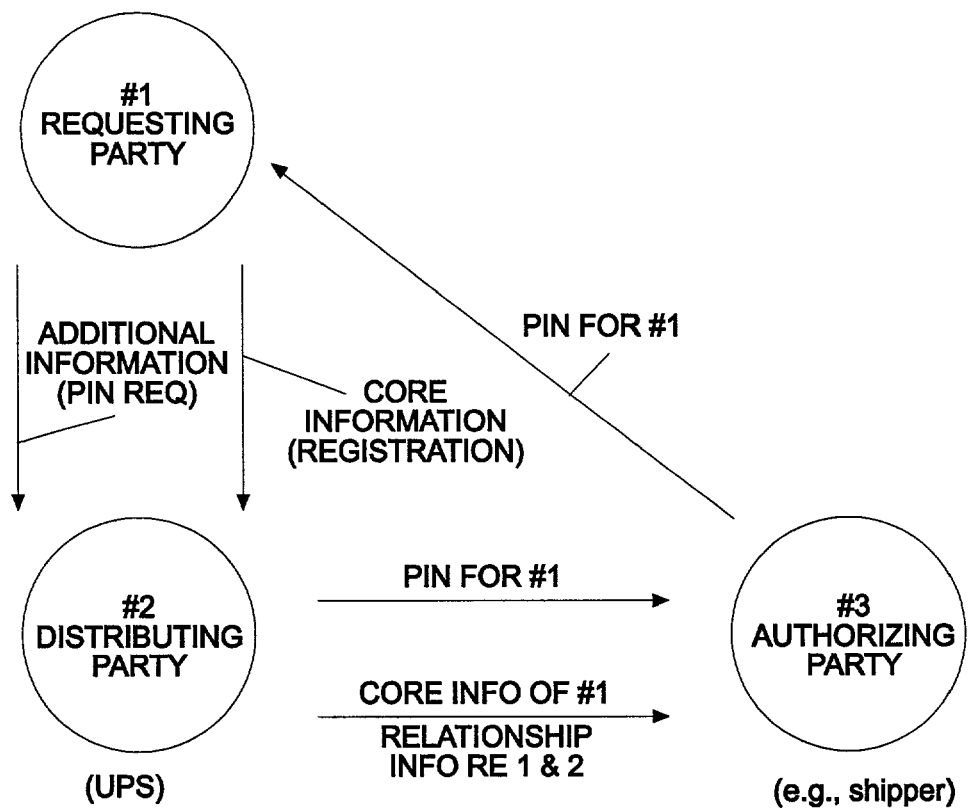
FIGS. 3A and 3B are illustrative charts showing interaction of the three parties, with the arrows showing the transfer of information, including instructions and passwords.
Figure 3B:
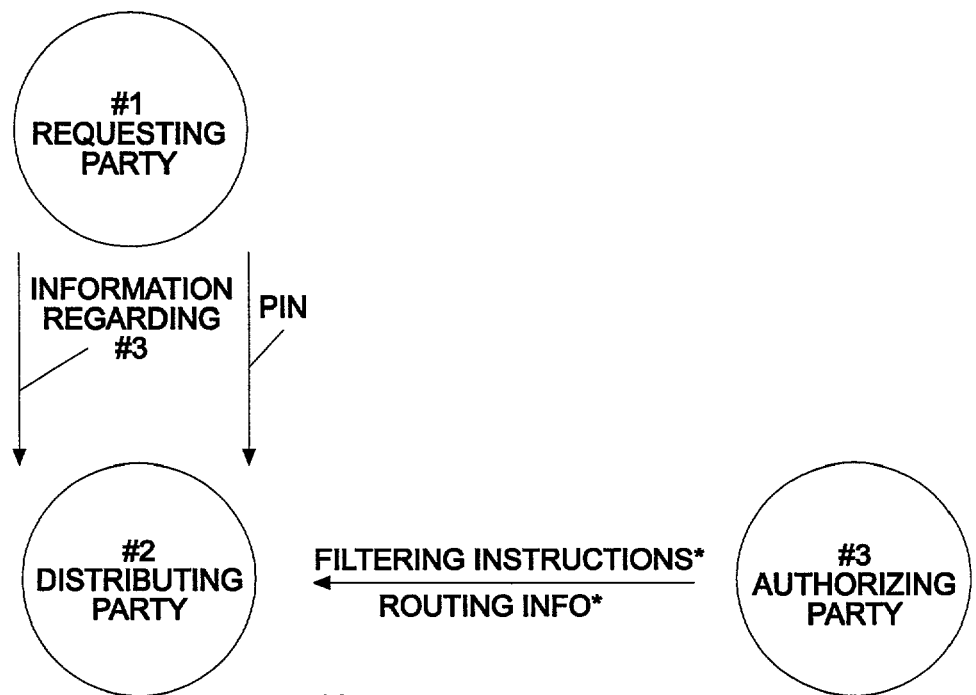

FIGS. 3A and 3B are illustrative charts showing interaction of the three parties.

Figure 4:
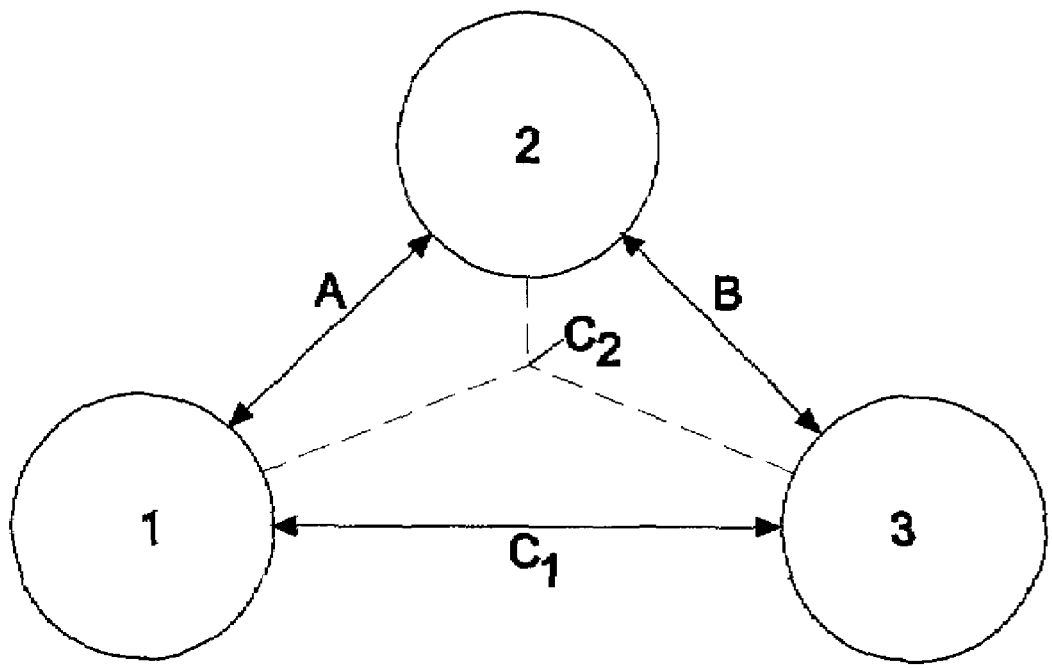
FIG. 4 illustrates the relationships between the three parties.

FIG. 4 illustrates the relationships between the three parties.

More Detailed Discussion

The present invention now will be described more fully hereinafter with reference to the above-described drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The system according to the present invention (a.k.a. "UPS Signature Tracking™) allows individuals to view proof of additional or "enhanced" delivery information beyond "core" information which is (in one embodiment) available to any visitor to a suitable website (e.g., www.UPS.com) who clicks on or otherwise selects a suitable "track" link and enters a tracking number. Specifically, in one embodiment, the "core" information is basic information such as whether the delivery was made or not. The "enhanced" information available can include the following:

full delivery name and address
any C.O.D. (cash on delivery) amount collected
reference numbers
a graphical image of the recipient's signature (which in one embodiment can be displayed over a watermark of UPS shields)

The "Requestors" who will be viewing the information are persons who have requested and have been forwarded a Personal Identification Number ("PIN") by a UPS shipper. Specifically, it is expected that the individuals requesting a PIN will be (i) employees, representatives and third party billing administrators of a UPS shipper and (ii) employees and representatives of recipients of packages from a UPS shipper. It is expected that individuals will typically be registering for Signature Tracking in the capacity of professionals only (not consumers).

Figure 5:
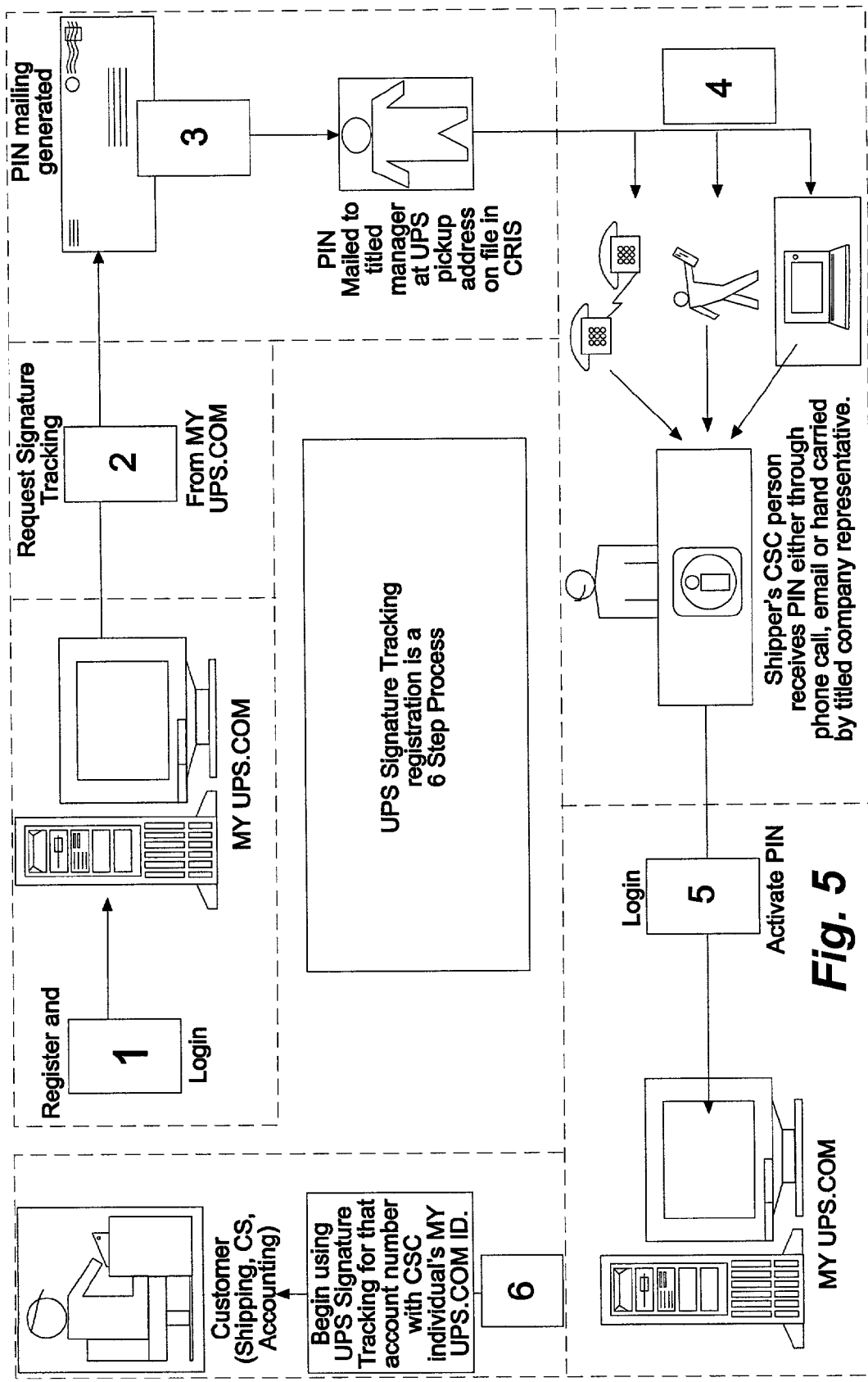
FIG. 5 is an overall flow chart illustrating various steps in the UPS Signature Tracking Process. This flow chart shows a six step process:
Step 1—Register and then Login
Step 2—Request Signature Tracking
Step 3—PIN Mailing Generated
Step 4—Requestor Receives PIN from Shipper's Representative
Step 5—PIN activated by Requestor
Step 6—Signature Tracking Used

FIG. 5 is an overall flow chart illustrating various steps in the UPS Signature Tracking Process. This flow chart shows a six step process:

Step 1—Register and then Login
Step 2—Request Signature Tracking
Step 3—PIN Mailing Generated
Step 4—Requestor Receives PIN from Shipper's Representative
Step 5—PIN activated by Requestor
Step 6—Signature Tracking Used Register and Login (Step 1)

Registration for Signature Tracking can be available through a website such as MYUPS.com, which in turn has its own registration process. Required information at the MYUPS.com registration can include name, street address, city, postal code, state or country, phone number and email address. This could be considered "self-authentication" registration. At this time, the user may opt out of receiving from UPS information about service updates and MYUPS.com enhancements.

Figure 6:
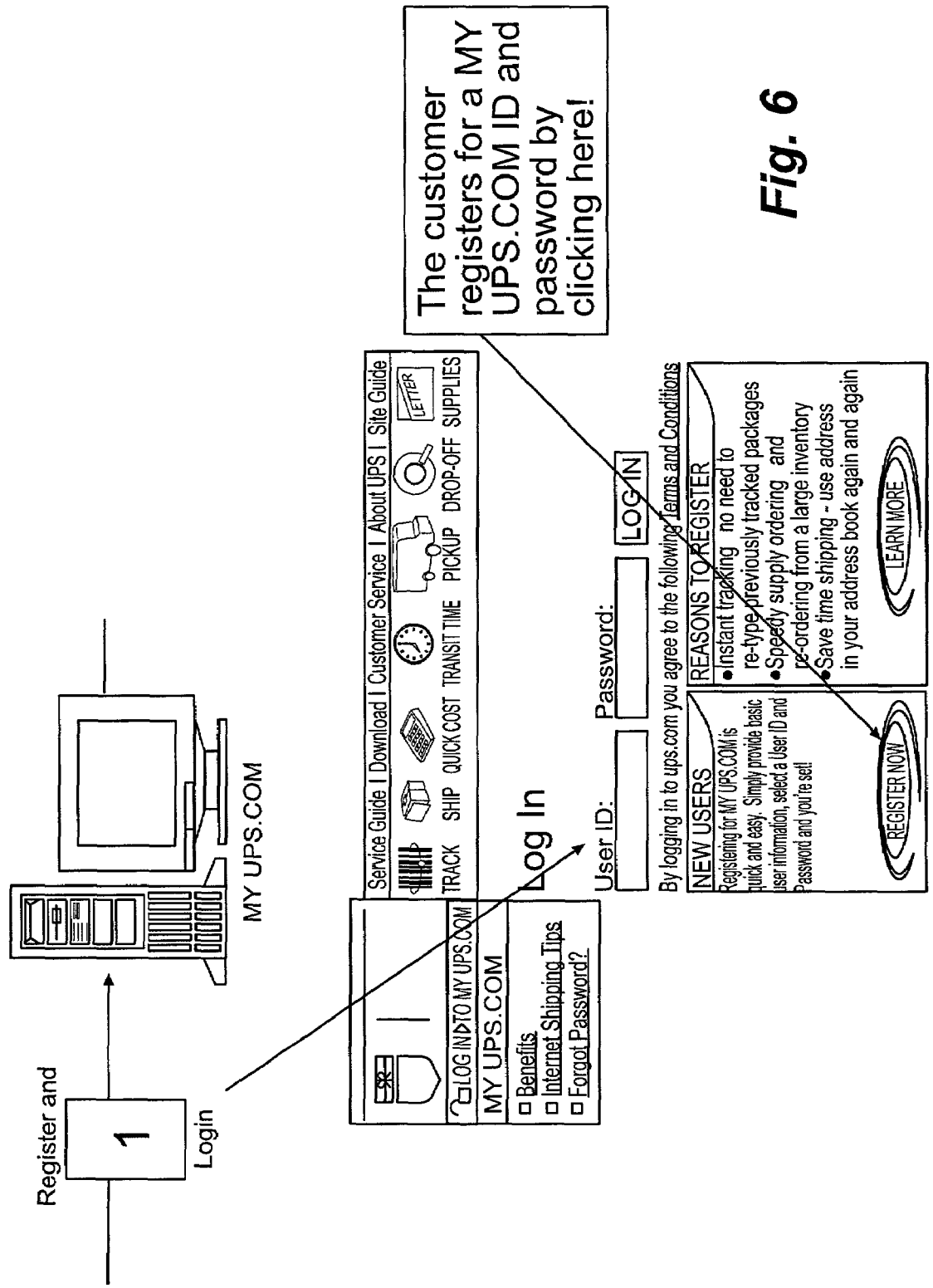
FIG. 6 is an illustrative view illustrating step 1 as it is conducted in association with a portion of an exemplary web page. Step 1, being the "Register or Login" step, allows a customer to login using a user ID and password, or may also register if they do not already have a UPS.COM ID.

FIG. 6 is an illustrative view illustrating step 1 as it is conducted in association with a web page. Step 1, being the "Register or Login" step, allows a customer to login using a user ID and password, or may also register if they do not already have a UPS.COM ID.

Figure 7:
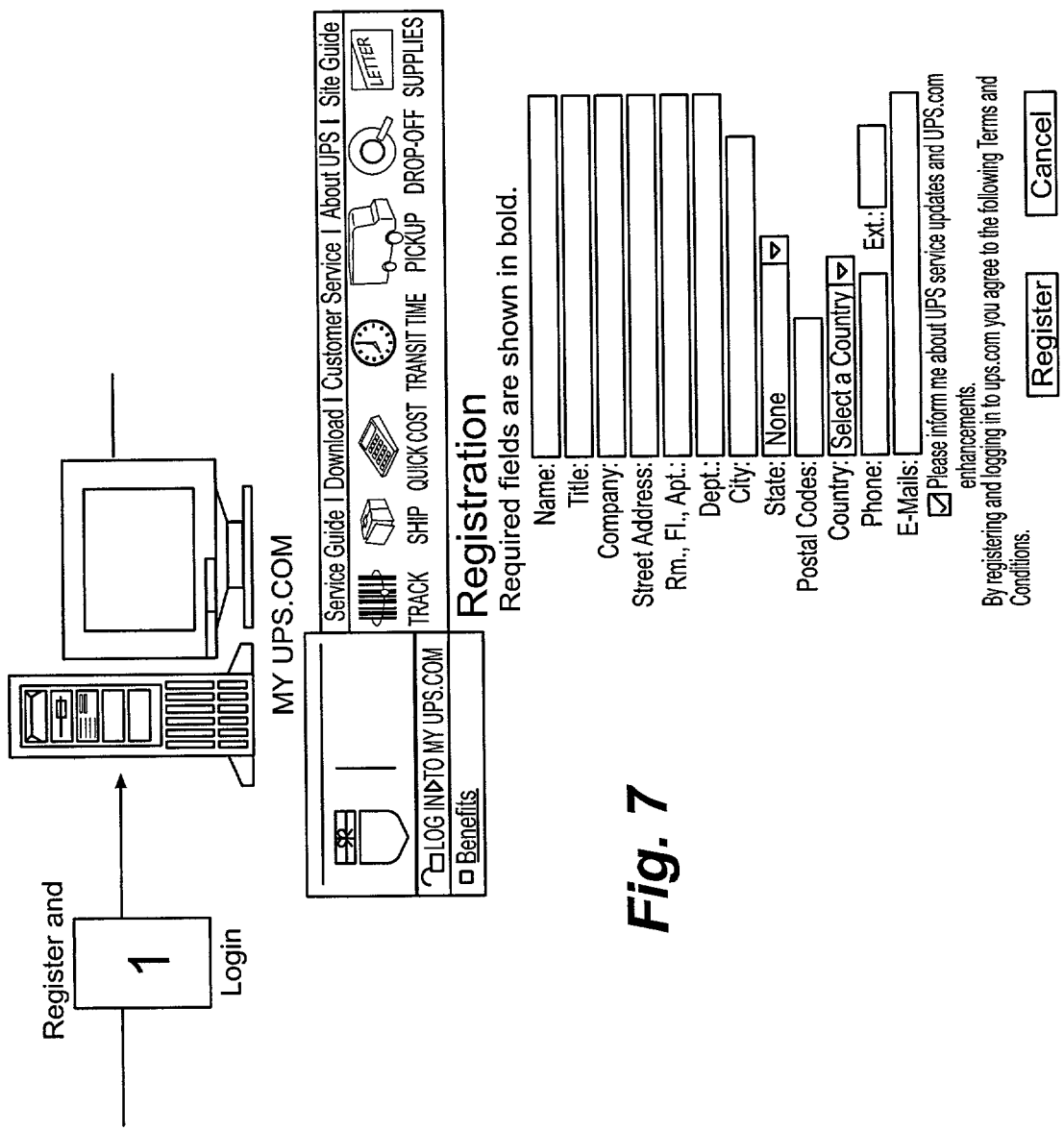
FIG. 7 is another illustrative view illustrating Step 1, which includes a copy of a web page which allows for the entry of registration information. As will be noted elsewhere in this application, this is the "Self-Authenticating" registration information.

FIG. 7 is another illustrative view illustrating Step 1, which includes a copy of a web page which allows for the entry of registration information. As will be noted elsewhere in this application, this is the "Self-Authenticating" registration information.

Figure 8:
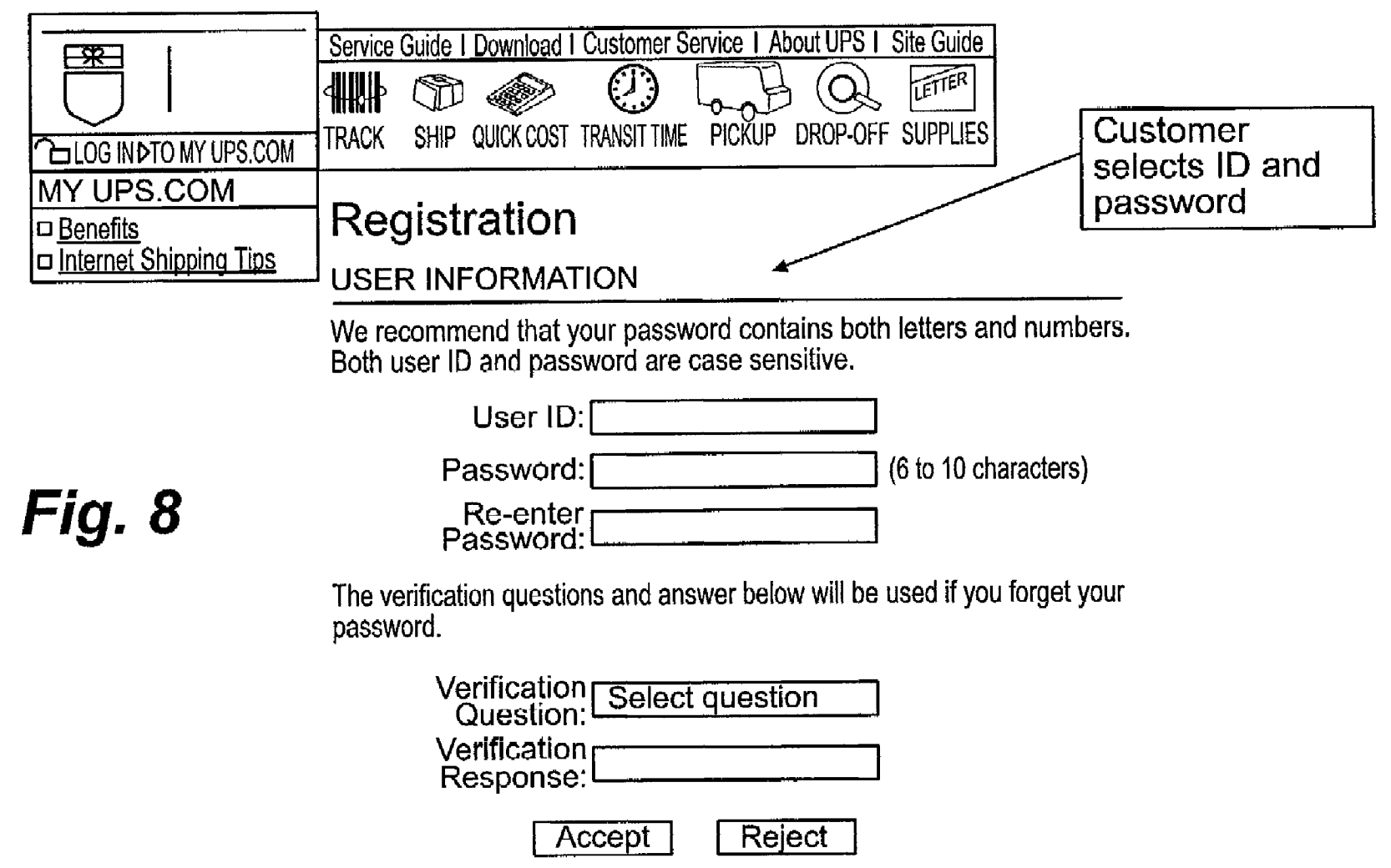

FIG. 8 is an illustrative view illustrating a web page which allows the customer to select an ID and a password. A "verification question" will also be provided as known in the art, if one forgets their password.

Upon entry of the requested information, a web page (not shown) is provided to confirm that the user has registered. The user is then directed through suitable links to allow the customer to login by going to a page such as FIG. 6, which enables the user to enter a user ID and a password. Once logged into MY.UPS.COM and brought to a web page such as shown in FIG. 9, the user can proceed to Step 2, which is the step of "requesting signature tracking".

Registration for Signature Tracking (Step 2)

To register for UPS Signature Tracking from the MYUPS.com website, the user must click on a link such as "View MYUPS.com". A drop-down menu will appear, and one of the options is "Request Signature Tracking". When the user selects "Request Signature Tracking" a clickwrap agreement appears. The user must scroll through the Agreement and click an "I Accept" button at the bottom. When the user presses the "I Accept" button, the user is presented with a registration form through which the user requests a PIN for access to Signature Tracking.

The user must then enter the following information:

1) a UPS account number (the UPS shipper number). This may be the account number of the user's employer, an entity from whom the user receives packages, or another UPS shipper who is willing to forward to that user a PIN.

2) a postal code that corresponds to the pick-up location of the UPS shipper whose account number was entered by the user. As discussed later, UPS can then cross-check this information with the information gathered at Step #1 above. It should also be understood that UPS periodically updates such location information, so this provides a "hard check" to confirm the accuracy of the location data provided by the requestor.

3) in the "In Care of" field, the title of the appropriate person at the UPS shipper location who is the manager of the UPS account. As shown in FIG., 10, the choices shown are Shipping Manager, Customer Service Manager, Distribution Manager, Mailroom Manager, Traffic Manager and Transportation Manager. This is also an important feature of the invention.

Note that the choices above can be those these set by the Second Party or can they differ for each account. In case of the latter this could be also said to be a selection of a PIN administrator by the user of a selection of PIN administrator groups designated by the shipper.

This selection could also be set by the administrator to a default address that will apply to all requesters.

Essentially these titles are generic and the initial group of titles is made available within the application at the user interface level. Titles can change depending on the most common business terminology. However, the address the PIN is sent to is based on direct feedback from the customer. This information is provided to the account executives of Party Two when an account is initially set up and may be updated from time to time depending on changes. This information is captured as the normal business process in establishing a formal relationship between entities. Also, the PIN letter addressee can change the PIN letter name & address by contacting the support staff of the Second Party. In this case they can designate a specific name as well as address for all PINs to go to.

FIG. 9 is an illustrative view which shows Step 2 of the multi-step process of FIG. 5, as well as a part of the web page that allows UPS signature tracking to be requested such that and a PIN mailing is later generated. Upon requesting signature tracking, the customer is presented with terms and conditions of an agreement for signature tracking. The customer typically scrolls down this page (not shown) to accept the particular service agreement. The customer can also be directed to explanations of "UPS Signature Tracking", which is one embodiment of the invention. The customer must scroll down through this information in order to complete the PIN requesting information. In one embodiment access is provided to at least "Full Address Information", "COD Information", "Reference Number", and "Electronic Signature". It should also be noted that the shipper has the flexibility to turn off elements by user or for all users and by country.

FIG. 10, discussed above, is a web page which illustrates how a customer can to select an account number from their active accounts, or they can add an account if they have the name, number, zip and country code for the account. The customer must also select an "in care of" title from the drop down box.

FIG. 11 is a more complete web page which includes the information as shown in FIG. 10.

Figure 12:
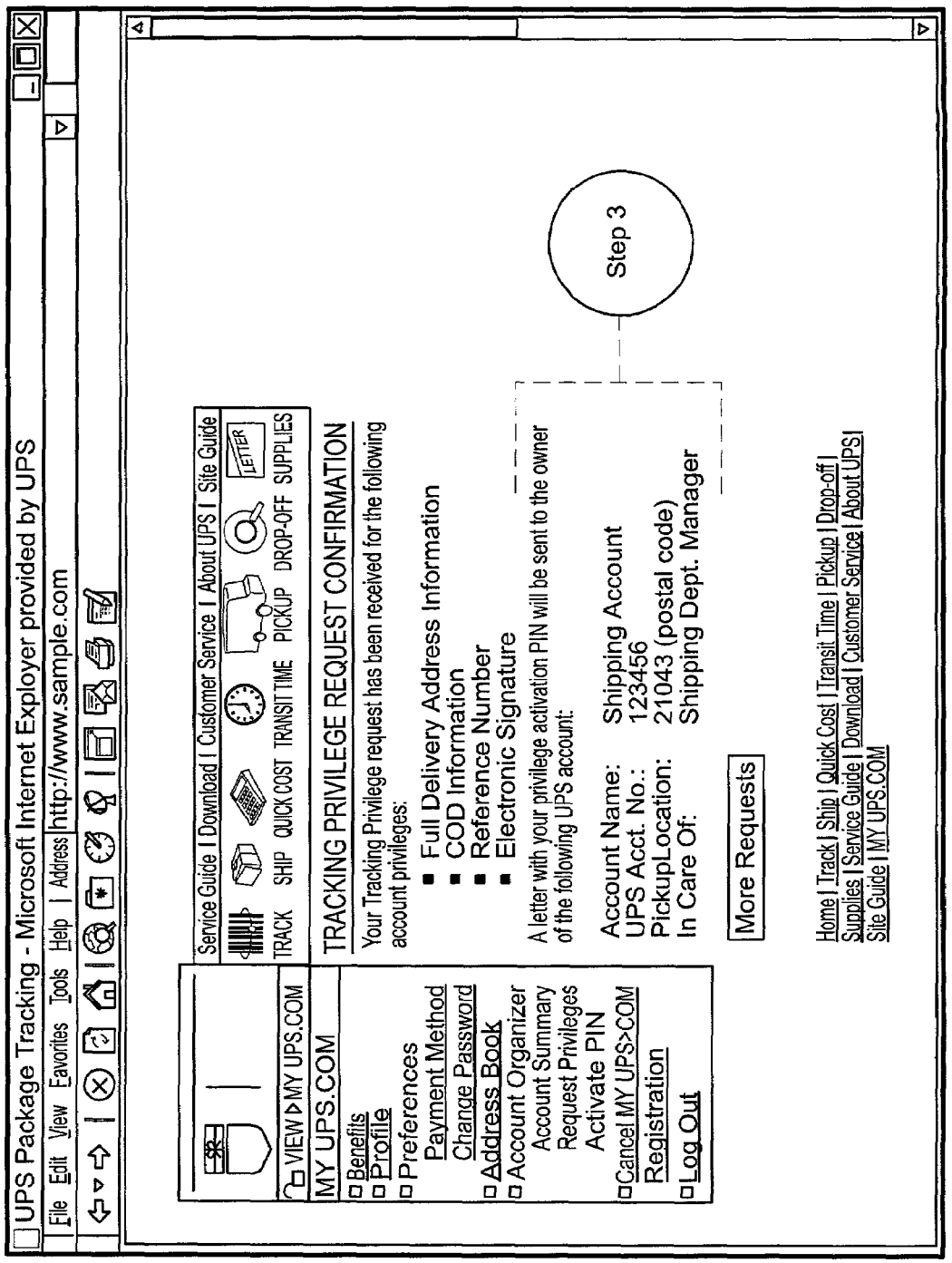
FIG. 12 is a web page that advises the requester that requestor's tracking privilege request has been received for certain account privileges. In this case, the account privileges are:
Full delivery address information
COD information
Reference number
Electronic signature

FIG. 12 is a web page that advises the requestor that requestor's tracking privilege request has been received for certain account privileges. In this case, the account privileges are:

Full delivery address information

COD information

Reference number

Electronic signature

Generation of Letter by UPS (a.k.a., the Second Party) to the Shipper (a.k.a. the Third Party) (Step 3)

Referring back again to the web page of FIG. 12, this web page also advises that a letter with the privilege activation PIN will be sent to the owner of the designated UPS account. This is "Step 3". Particularly, UPS (a.k.a., the Second Party) generates a pair of letters such as shown in FIG. 13. In one embodiment these letters are generated by the end of the next business day addressed to the package pickup location for the UPS account and to the attention of the person selected in the "In Care of" field. The package pickup location is retrieved from a database of UPS accounts. An alternate PIN letter mailing address may be established by the owner of the account as discussed elsewhere in this application.

The dotted lines in FIG. 13 illustrate Step 3 of the process, in which a PIN mailing is generated, and the PIN is mailed to the titled manager. In this particular embodiment, the designated person (i.e., a Shipping Manager) will receive a letter in the mail containing the requestor's PIN. In one embodiment, if the requesting customer does not receive the PIN within two weeks, they are instructed that they should contact the "in care of" title they selected when they requested the PIN.

The letter on the left of FIG. 13 is a letter from UPS to the Shipper's representative, which advises that a Requestor has requested the right to see certain tracking information through access to Signature Tracking. It further advises the Shipper's representative that if the Shipper wishes to grant this access to privilege information, that a PIN should be forwarded in the enclosed PIN Request Granted form.

The letter on the right of FIG. 13 (the "PIN" letter) is the second letter of the two, actually includes the PIN, and is to be forwarded along by the shipper as discussed below. In one embodiment of the invention, the Signature Tracking clickwrap agreement that was accepted in electronic form by the requester is sent in hard copy form with this letter. The Shipper's Manager who receives this PIN letter may in his/her discretion forward the PIN to the requester which will allow the requester access to Signature Tracking. The Manager is provided with information about the requester based on the requester's MYUPS.com profile, and can confirm this information is desired before passing along the PIN.

It is important to note that the person/entity forwarding the PIN will not know the MYUPS.com login password which will need to be used by the requesting party with the PIN to activate signature tracking.

Requestor Receives PIN from Shipper's Representative (Step 4)

Figure 14:
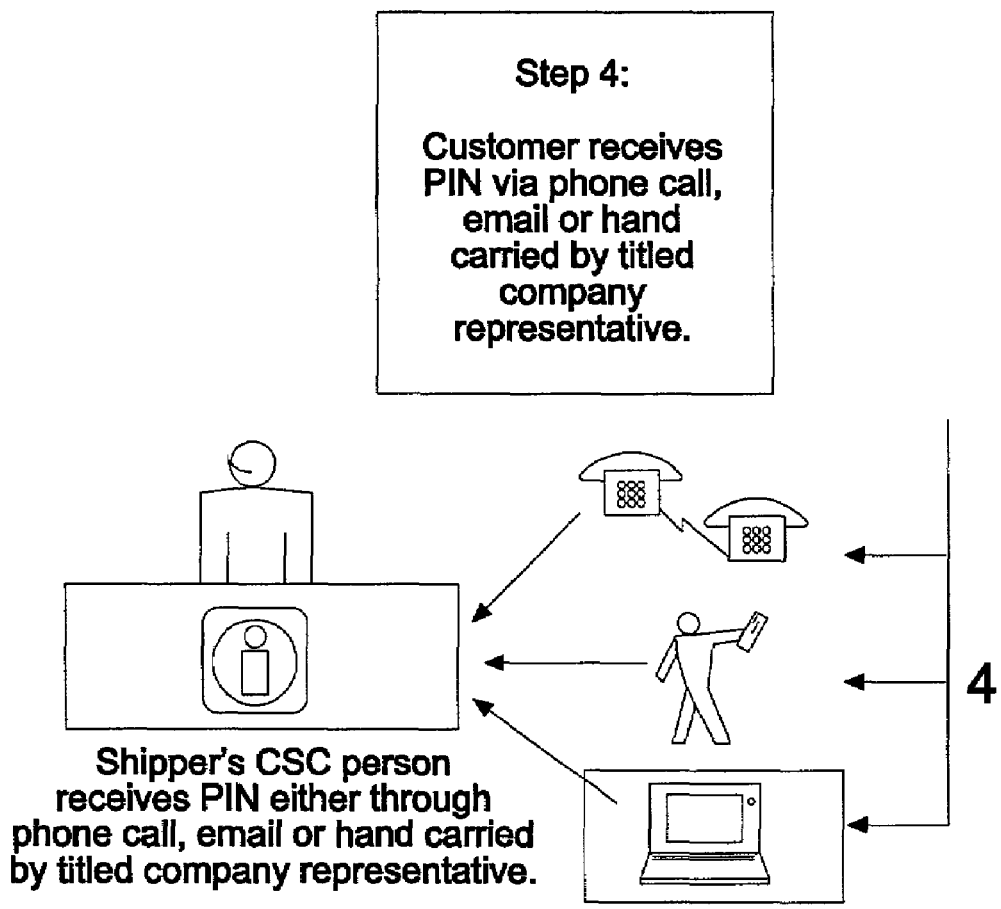
FIG. 14 is an illustrative view of the process providing Step 4 of the six step process, in which the customer receives the PIN via any preferred method such as phone call, e-mail or hand delivery by the titled company representative.

FIG. 14 is an illustrative view of the process providing Step 4 of the six step process, in which the customer receives the PIN via any preferred method such as phone call, e-mail or hand delivery by the titled company representative.

Activation of PIN (Step 5)

Generally described, Step 5 of the six step process is then accomplished when the customer, now having the PIN, then logs into a suitable web site such as shown in FIG. 6 (e.g. MYUPS.COM), and thereafter activates signature tracking using the ID that matches the shipper number and PIN.

Described in further detail, when (and if) the requester (the First Party) receives a PIN from the Manager (the Third Party), the Requestor must log into MYUPS.com (the Second Party), select "View MYUPS.com" and further select "Activate Signature Tracking" from the drop-down menu. The Requestor will be prompted to enter the PIN. The Requestor will not need to enter a PIN again at a later time; the Requestor's username will be flagged as having access to Signature Tracking.

Figure 15:
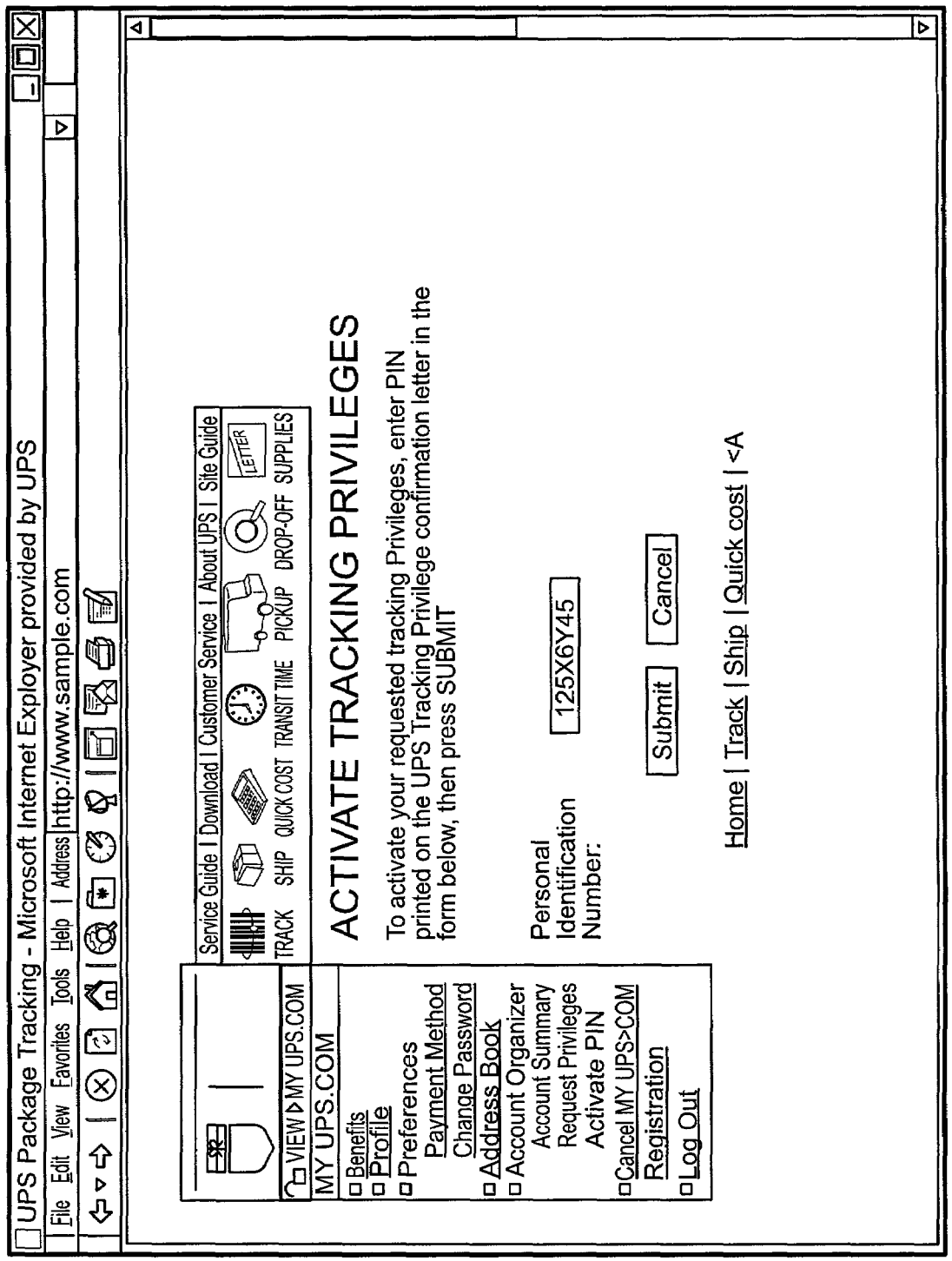
FIG. 15 is a web page that allows the PIN requestor to enter the PIN, which was printed on the Tracking Privilege Confirmation Letter in the form letter sent to them by the shipper. This will activate Signature Tracking.

FIG. 15 is a web page that allows the PIN requestor to enter the PIN, which was printed on the Tracking Privilege Confirmation Letter in the form letter sent to them by the shipper. This will activate Signature Tracking.

Figure 16:
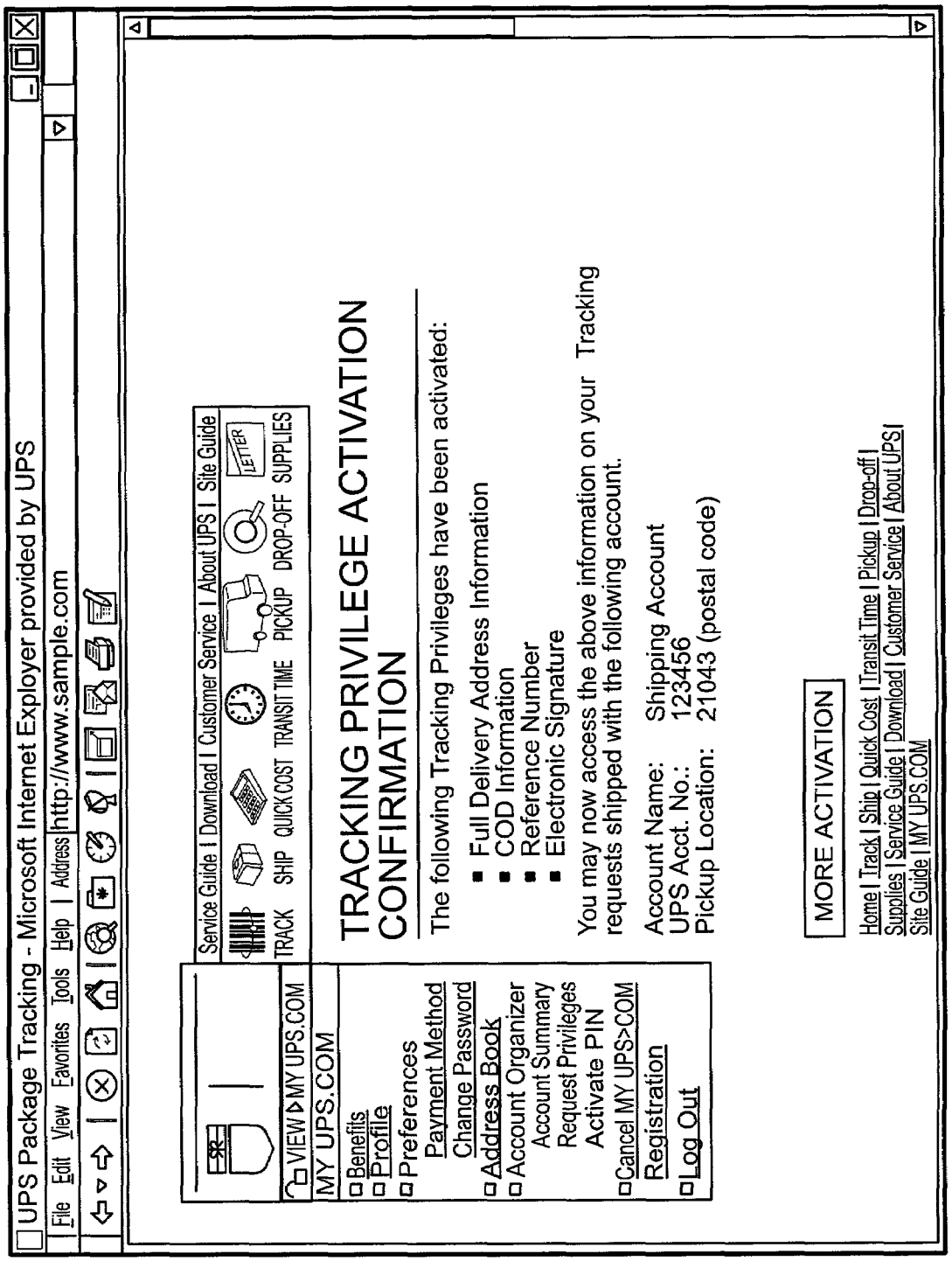
FIG. 16 is a subsequent web page, which indicates that tracking privileges have been activated, for certain type of information, in this case:
Full delivery address information
COD information
Reference number
Electronic signature

FIG. 16 is a subsequent web page, which indicates that tracking privileges have been activated, for certain type of information, in this case:

Full delivery address information
COD information
Reference number
Electronic signature The requestor(a.k.a. "user") is then advised that they may now access the above information with a particular account, in this case account number 123456. The user can then return to the UPS.COM home page. The user is again allowed to select an associated web site to access the privileged information, which in this case can be MY UPS.COM.

Reference is again made to FIG. 6, which is "login page," allows a user to include a user ID and a password. It should be understood in reference to this login page, that the tracking provided under one embodiment of the present invention provides access to enhanced delivery information for only the UPS shipper number requested. Requests are completed for a single combination of ID, shipper number, and PIN. Activation of a MY UPS. COM ID for a shipper does not activate all other MY UPS. COM ID's for that shipper number.

Figure 17:
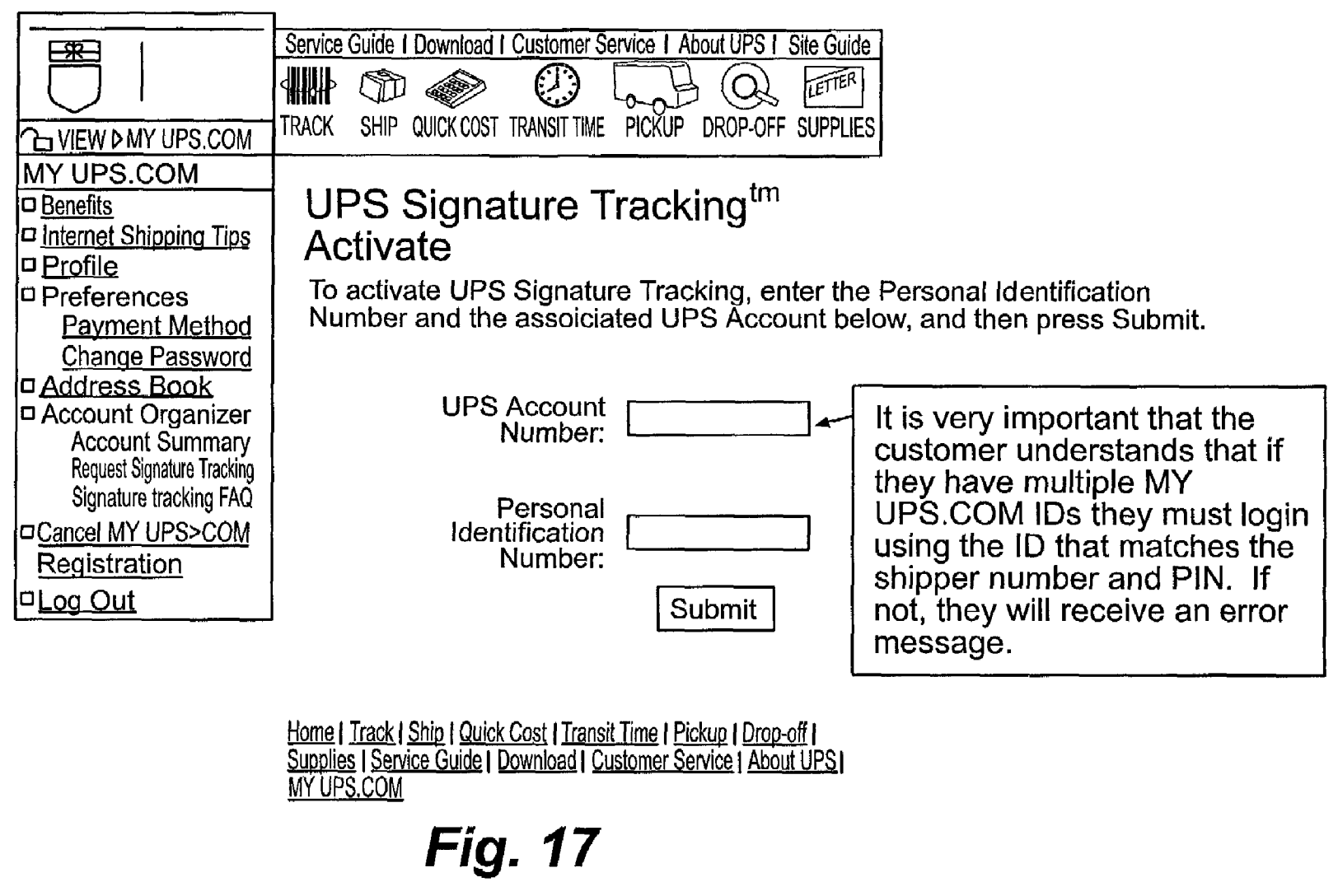

FIG. 17 is another web page similar to FIG. 15, which allows for the requestor/user to activate UPS Signature Tracking by entering a PIN and the associated UPS account, and then pressing the Submit button. It is very important that the requestor/user understand that if they have multiple ID's, they must login using the ID that matches the shipper's number and the PIN. If not, they will receive an error message.

FIG. 18 is a copy of a subsequent web page which shows that an error message has been provided if the PIN number or UPS account number is incorrect.

FIG. 19 is an alternate subsequent web page which is shown if the correct PIN is used. The delivery information listed will now display when the customer is tracking packages using their MY UPS.COM ID. It should here be noted that the term Signature Tracking may be considered a trademark of applicant.

A web page (not shown) can be used provided to the user to allow the customer to review frequently asked questions regarding the tracking feature provided by the invention. Another web page (not shown) can be used which allows the user to use e-mail to provide questions regarding the service. It may also be noted that the 1–800 number may be used to allow a shipper to designate a specific address to send PINs to for or some or all of their UPS account numbers.

Use of the PIN; Characteristics (Step 6)

As noted elsewhere in this application in one embodiment, the PIN, when granted, grants access to Full Delivery Address, Signature Image, COD Information, and Customer Reference Numbers, although other information may likewise be included as discussed elsewhere in this application.

Note that a PIN is entered only once and allows a single ID to access ONE shipper number. If additional shipper numbers are needed, that ID must complete another request for a PIN for that shipper number.

Thus PINs are unique to each user and based on a User ID/Shipper Number relationship, although multiple PINS may be used by a single user.

As noted above, the use of a PIN-based mechanism allows the managing of delivery of privileged tracking information from UPS.com. Under one embodiment of the present invention, PINs are for registered MyUPS.com users only. Note, however, that if the PIN is not granted to the requester, the requestor is still able to independently use MYUPS.com.

Note however that the PIN can be retired at any time. Under one embodiment it is set up so that the PIN will expire in two years. Note that a warning is also used to warn customers that a PIN is about to expire. A PIN could also be set up to be used just once.

Figure 20:
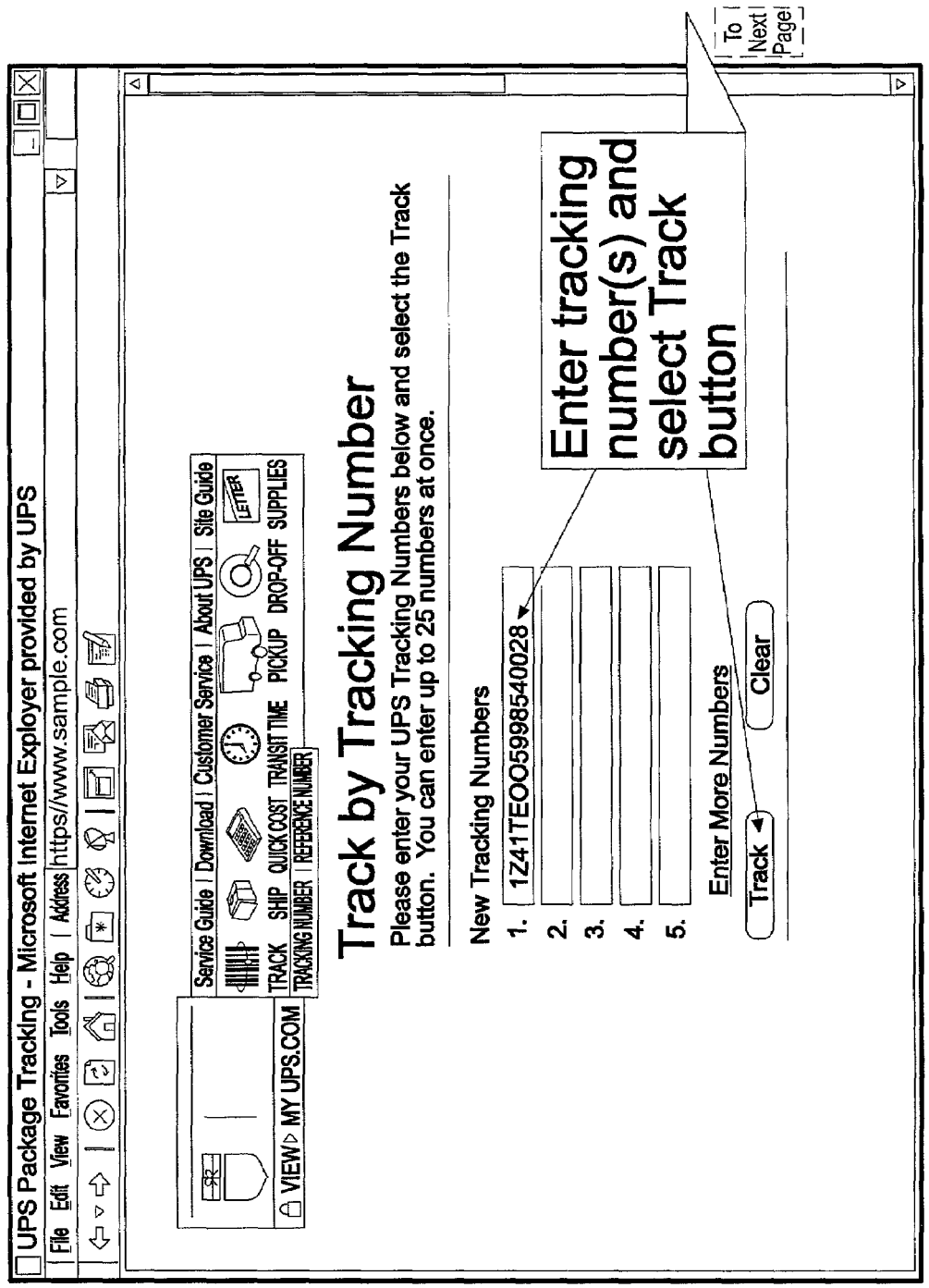
FIG. 20 is a subsequent web page which allows one using the signature tracking feature to enter one or more tracking number(s) of an item such as a parcel and select the "Track" button.

FIG. 20 is an example subsequent web page which allows one using the signature tracking feature to enter one or more tracking number(s) of an item such as a parcel and select the "Track" button.

Figure 21:
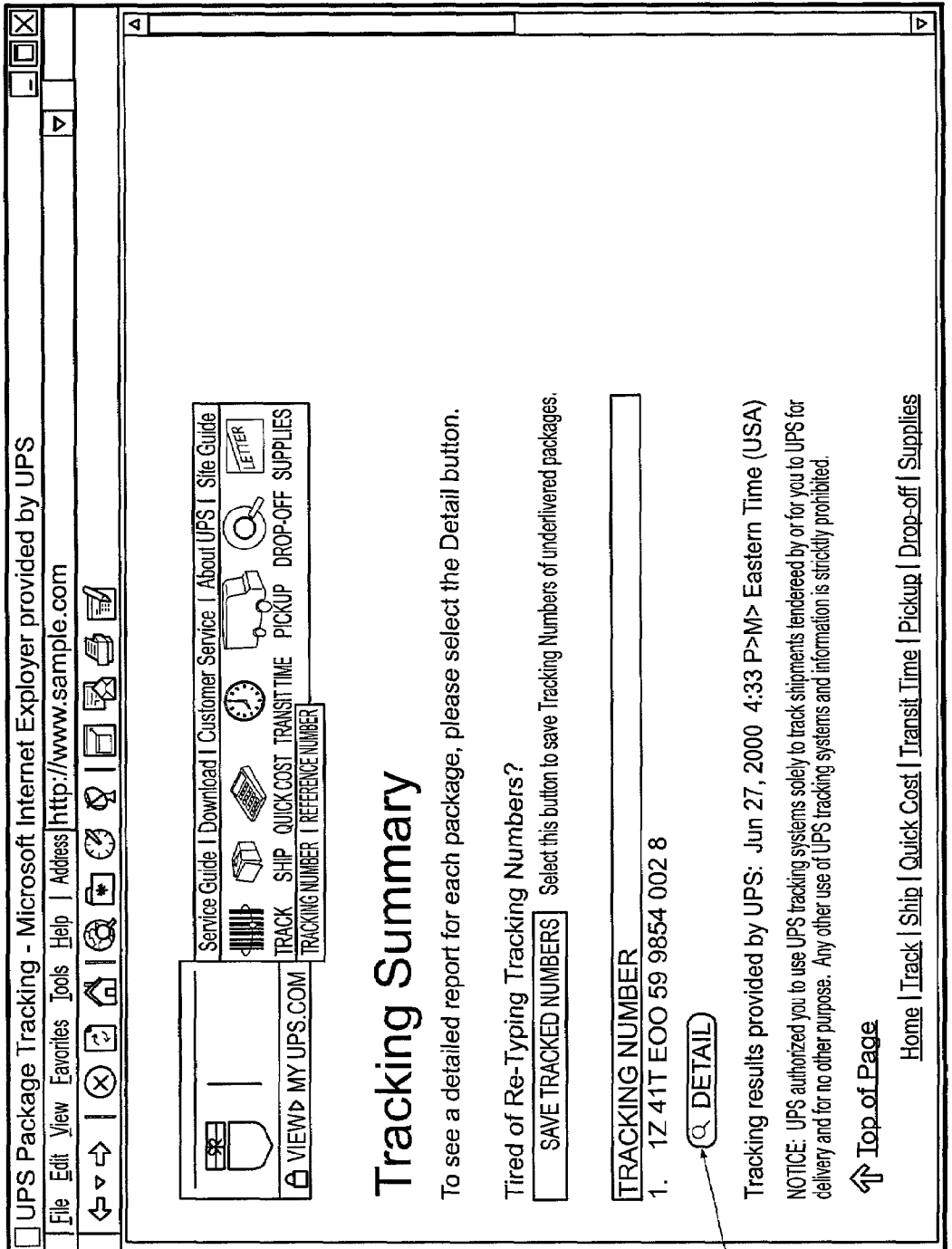
FIG. 21 is an illustrative view of a subsequent web page which allows the user to select details regarding the tracked parcel.

FIG. 21 is an illustrative view of a subsequent web page which allows the user to select details regarding the tracked parcel.

Figure 22:
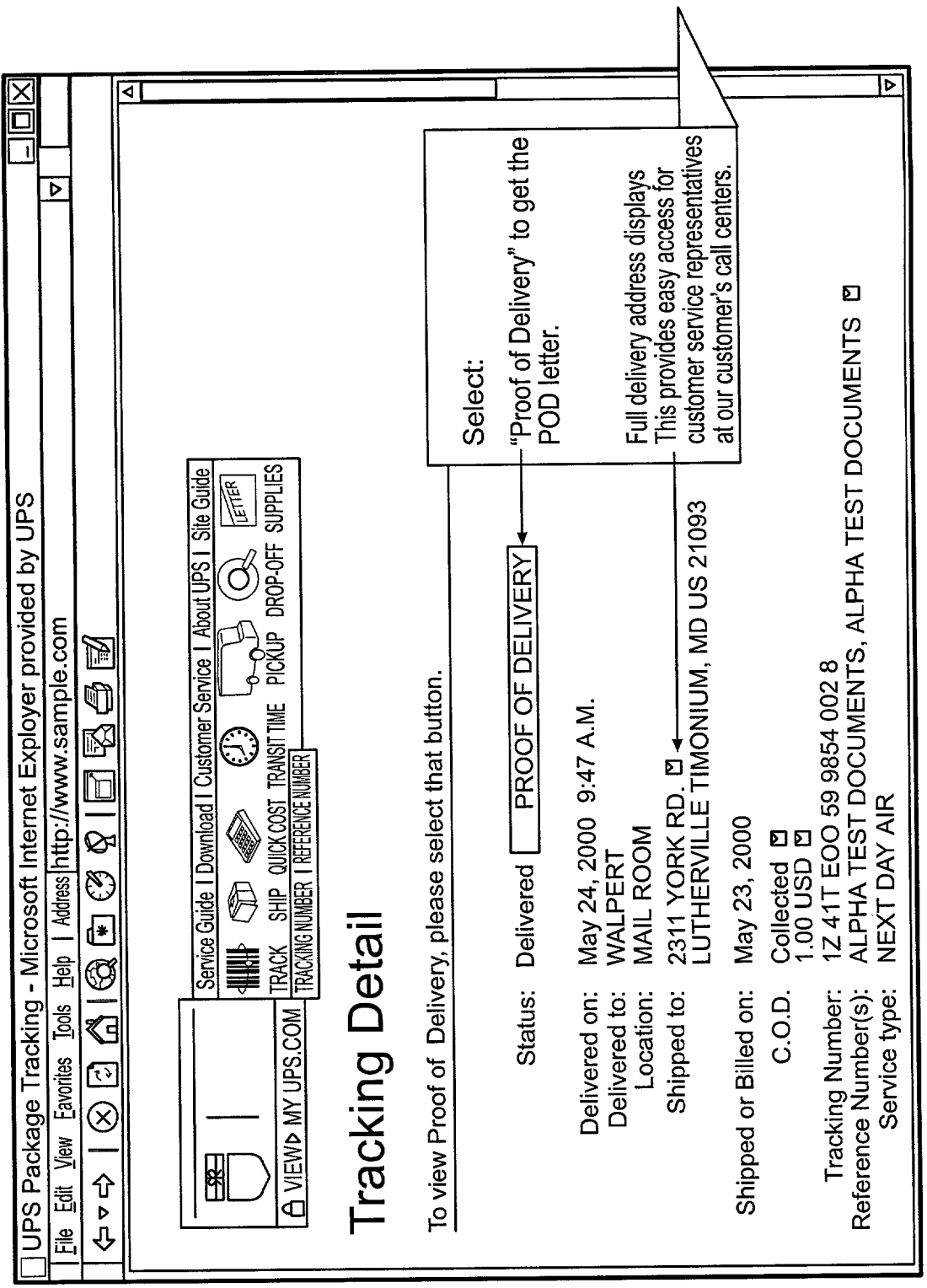
FIG. 22 is an illustrative view of a subsequent web page which allows the user to view information regarding delivery address and other relevant information. It also allows the user to select "proof of delivery" in order to get a "proof of delivery" letter (a.k.a. a POD letter).

FIG. 22 is an illustrative view of a subsequent web page which allows the user to view information regarding delivery address and other relevant information. It also allows the user to select "proof of delivery" in order to get a "proof of delivery" letter (a.k.a. a POD letter).

Figure 23:
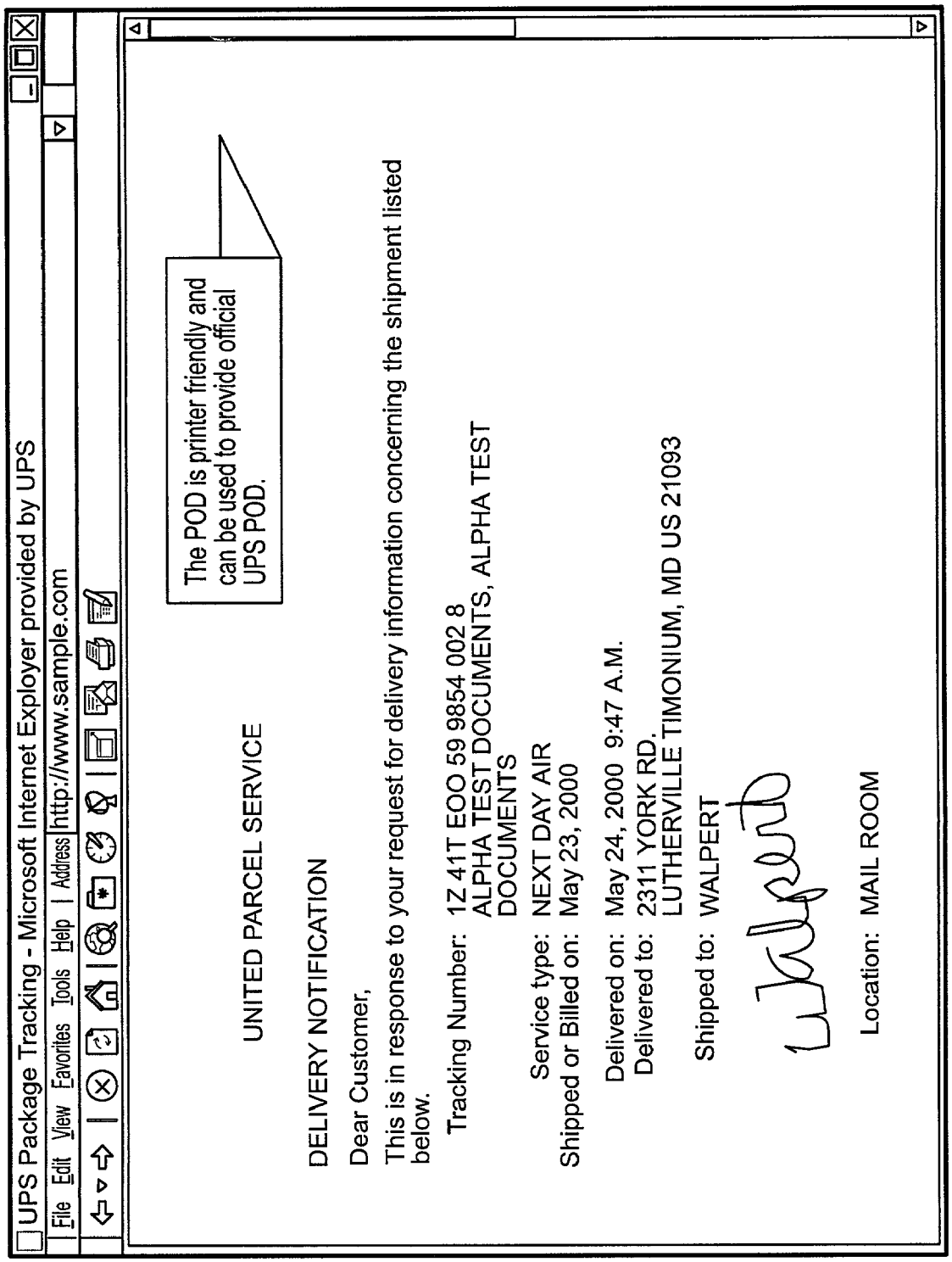
FIG. 23 illustrates a subsequent web page which allows the user to see a proof of delivery letter, which can be printed to provide a "official" UPS proof of delivery document. As may be seen, this document may include signature images, in this case used in conjunction with a "water mark".

FIG. 23 illustrates a subsequent web page which allows the user to see a proof of delivery letter, which can be printed to provide a "official" UPS proof of delivery document. As may be seen, this document may include signature images, in this case used in conjunction with a "water mark".

The Shipper's PIN Administrator

One feature of the present invention includes the use of one or more designated "PIN administrators".

Note that with respect to functionality, at least some shippers can call an 800 number to request that all PIN requests be sent to a single contact and location for any or all of their shipper numbers.

Suppression of Selected Data Fields

At the shipper's request or at the discretion of UPS (the "Second Party"), UPS may choose to suppress certain information for a particular UPS shipper. UPS can manually enable and disable services and privileges through the Administrator interface. UPS can turn on/off any of the available features by country, UPS Account Number, or Individual membership ID, or globally.

Any one of the features available may be toggled on/off according to a particular user, a country, an account number, or globally.

It should be understood that this filtering process allows different shippers ("Third Parties") to adapt the system according to their own particular needs and sensitivities; one Shipper may be sensitive only to COD information whereas another shipper may be sensitive to signature information. The invention allows multiple people to turn off different things depending on their particular sensitivities.

Integration with MY UPS.COM

It may be understood that the PIN-based system according to the present invention is available to all MY UPS.COM registered users, and thus can benefit from the vast amount of experience relating to same.

Security Features

It should be understood that Signature Tracking Users will be accessing and receiving the proof of delivery data from the UPS server over a secure SSL line. UPS has taken a leadership technology position by offering security for enhanced delivery information display via the Web.

It may thus be seen that there are several different layers of security provided under the present invention. This includes User registration PIN based authentication process that allows the shipper to determine who should have access to enhanced delivery information.

Access control that requires a PIN, shipper number, and ID combination be activated to gain access to enhanced information.

The ability to turn off a user(s) for a specific data element such as digital signature, delivery address, reference number, or COD amount.

Reporting Aspects

This could be otherwise known as monitoring. Reports may be used, which can be generated automatically or upon request, which provide the authorizing "third" party with some indication of whether or not there authorized information is being used as expected, or is being used in excess possibly for developing a database.

For example, the third Party could be given a report with all of its associated "Party One" information, indicating what each of those parties are doing.

This reporting could be done by volume of inquiries, although other types of reporting could be done, such as by volume of data, transferred or other suitable means.

The ability to monitor may be an advantageous feature for the Third Party, and may determine whether or not the Third Party engages the overall relationship.

Benefits

A key benefit to the shipper is that they have control over who does and does not get access to enhanced delivery information.

The shippers have control over who accesses and views enhanced delivery information including: digital signature, COD amount, full delivery address and reference numbers. Furthermore, the shipper has the ability to turn the privileges off for a single user ID or for all user IDs by data element (digital signature, COD, full delivery address). Knowing the ID is critical to this capability.

The invention should reduces CSC call volume and related costs for all parties involved. Improved customer service representative response times and accounting processing time are also provided.

The shippers are also provided with the flexibility to turn off certain enhanced information such as digital signature, COD and full delivery address. The shipper's internal costs are also reduced.

Relationship Discussion

One unique aspect of the invention is that, with respect to parties 1, 2, and 3, (a.k.a. First Party, Second party, Third Party) none of these parties has to go out and search to locate the other two parties in order create the relationship. For instance, Party One does not have to know everything about Party 3 in order find out about Party 3. Also, with respect to Party 3, Party 3 may want their information to be found out, but under this model Party 3 does not necessarily have to go out and "seek" such parties.

One of the values of the model under the present invention is that Party 3 may not know anything about Party 1, but due to the establishing of the relationships, but eventually Party 3 will know something about Party 1, by the fact that Party 1 has made a request to find out about the relationship between Parties 2 and 3.

With respect to FIG. 4, if Party 1 comes and establishes a relationship with Party 2, this relationship will be referenced as Relationship A. That relationship is authenticated on an individual level. (The term I indicates an individual relationship; the term C indicates a corporate relationship).

Relationship B of FIG. 4 is the relationship between Parties 2 and 3. Relationship C-1 of FIG. 4 is a relationship between Party 3 and Party 1. Relationship C-2 of FIG. 4 is a relationship between all of the parties, and is a conceptual relationship.

Use In Other Environments

It should be understood that the above-described invention could be used as a stand-alone The invention may also be used within a variety of environments in which sensitive information is used.

Hospital Records

Reference is now made to a three-party scenario involving medical records.

Party One is the Requester of the medical records. This could be a variety of individuals, such as a doctor, attorney, family member or agent.

Party Two is the Records Holder, which in this case could be a hospital records keeper.

Party Three is the authorizing party, which in this case can be a hospital patient or an authorized agent, whose records are being held by Party Two. In another embodiment this could be a hospital administrator which has established a relationship with the client.

Credit

This could also be applied to a credit information example, with the example being where a potential auto purchaser ("Purchaser"—Party Three) approaches an auto dealer ("Dealer"—Party One) regarding the purchase of an automobile. In order to evaluate the credit of Purchaser, Dealer wishes to engage the service of a credit information agency (Credit Reporter—Party Two), in order to review certain credit records of the Purchaser.

The Dealer (Party One) registers with the Credit Reporter (Party Two). The Dealer (Party One) then further submits a PIN request to the Credit Reporter (Party Two) to access certain records of the Purchaser (Party Three). The PIN is passed on to the Purchaser (Party Three) who then forwards it to the Dealer (Party One).

One notable feature of the above concept is that the credit information is not made available to all dealers of automobiles, only the dealer selected by the purchaser. It should also be noted that the selected access of information again can be filtered by the purchaser. As an example, the purchaser could restrict access to certain credit information and release other information.

Other Areas where Invention can be Used

An "E—Toy" example is as follows. A customer wants to use a Visa account to buy from E—toy. E—Toy is Party One—it sends of a PIN request to Visa (Party Two), who sends a PIN request to the customer (Party Three), who can forward it if so desired.

Domestic services (such as nannies) could be provided as follows. A nanny is Party Three. A nanny service is Party Two. A parent (needing a nanny) could be Party One. In order to get information regarding the nanny, the parent may make a PIN request to the nanny service who, passes it on to be nanny. Dating services could also be similarly provided.

Clarification of Certain Terms

It may be understood that information about one party may be thought of as that party's "information", and that party may have an "interest" in that information. As an example a "First Party" may have an interest in the dissemination of First Party Information which is medically-related; that interest may be that such information should be kept in strict confidence when at all possible. That interest may instead be an interest that the First Party Information, while it can be disseminated more freely, must be accurate. The fact that someone has an "interest"in information does not necessarily mean that they own or do not own the information. Such an interest can take many different forms and in fact can vary for each user and can vary due to local or national law or regulations.

If something is "facilitated", it is made possible. As an example, a request from one party to a second party can be "facilitated" by the second party (or anyone for that matter) providing the necessary computer systems to allow the first party to "go onto the internet", and by entering requisite information on a form, issuing a request to the second party. The forwarding of such a request can also be similarly done by use of a computer or other automated means.

Information can be "held" by a party by storing the information on computer or other suitable storage devices. Such "holding" can be on the premises of the holder, or can be at the direction of the holder at a remote location.

Hand delivery includes actual delivery of an item to a physical address and does not include emails.

An authorization code can include a PIN.

CONCLUSION

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method of authorizing the transfer of various types of information within a group of parties, said parties including a First Party, a Second Party, and a Third Party, said First Party holding First Party Information, and said Third Party is a person having an interest in Third Party Information that relates to information personal to said Third Party that is held by said Second Party, said method including the following steps:

transmitting a Request from said First Party to said Second Party, said Request being to allow said First Party to access said Third Party Information held by said Second Party;

forwarding said First Party's Request from said Second Party to said Third Party, said Request accompanied by an Authorization Code authorized by said Second Party;

authorizing of said First Party's Request by said Third Party by the transfer of said Authorization Code from said Third Party to said First Party; and presenting said Authorization Code from said First Party to said Second Party, such that said First Party is authorized to obtain said Third Party Information from said Second Party.

2. The method as claimed in claim 1, further comprising the step of allowing said First Party to designate a related internal party to receive said Authorization Code from said Third Party.

3. The method as claimed in claim 1, wherein said access to at least a portion of said Third Party Information can be later withdrawn.

4. The method as claimed in claim 1, further comprising the step of reporting by said Second Party to said Third Party as to who has access the said Third Party Information and their access status.

5. The method as claimed in claim 1, wherein said Third Party Information relates to parcel delivery.

6. The method as claimed in claim 1, wherein said Third Party Information relates to parcel delivery, and includes "delivery name and address" and "reference number".

7. The method as claimed in claim 1, wherein said Third Party Information relates to medical records.

8. The method as claimed in claim 1, wherein said Third Party Information relates to credit information.

9. The method as claimed in claim 1, wherein said First Party and said Third Party are different sub-entities within an overall commonly-controlled entity.

10. The method as claimed in claim 1, wherein said First Party and said Third Party are different entities within an overall commonly-controlled company.

11. A method of authorizing the transfer of various types of information within a group of parties, said parties including a First Party, a Second Party, and a Third Party, said First Party holding First Party Information, and said Third Party is a person having an interest in Third Party Information that relates to information personal to said Third Party that is held by said Second Party, said method including the following steps:
- transmitting a Request from said First Party to said Second Party, said Request being to allow said First Party to access said Third Party Information held by said Second Party;
- forwarding said First Party's Request from said Second Party to said Third Party, said Request accompanied by an Authorization Code authorized by said Second Party;
- authorizing of said First Party's Request by said Third Party by the transfer of said Authorization Code from said Third Party to said First Party, said transfer done via hand delivery to a physical address associated with said Third Party; and
- presenting said Authorization Code from said First Party to said Second Party, such that said First Party is authorized to obtain said Third Party Information from said Second Party.

12. The method as claimed in claim 11, further comprising the step of allowing said First Party to designate a related internal party to receive said Authorization Code from said Third Party.

13. The method as claimed in claim 11, wherein said Third Party Information relates to parcel delivery.

14. The method as claimed in claim 11, wherein said Third Party Information relates to parcel delivery, and includes "delivery name and address" and "reference number".

15. The method as claimed in claim 11, wherein said Third Party Information relates to medical records.

16. The method as claimed in claim 11, wherein said Third Party Information relates to credit information.

17. The method as claimed in claim 11, wherein said First Party and said Third Party are different sub-entities within an overall commonly-controlled entity.

18. The method as claimed in claim 11, wherein said First Party and said Third Party are different entities within an overall commonly-controlled company.

19. A method of authorizing the transfer of various types of information within a group of parties, said parties including a First Party, a Second Party, and a Third Party, said First Party holding First Party Information, and said Third Party having an interest in Third Party Information held by said Second Party, said method including the following steps:
- identifying, by said Second Party, the physical address associated with said Third Party;
- transmitting a Request from said First Party to said Second Party, said Request being to allow said First Party to access said Third Party Information held by said Second Party;
- authorizing said First Party's Request by said Third Party by the transfer of said Authorization Code from said Third Party to said First Party; and
- presenting said Authorization Code from said First Party to said Second Party, such that said First Party is authorized to obtain said Third Party Information from said Second Party.

20. The method as claimed in claim 19, wherein said forwarding being done via hand delivery to said physical address associated with said Third Party is provided by First Class Mail.

21. The method as claimed in claim 19, further comprising the step of allowing said First Party to designate a related internal party to receive said Authorization Code from said Third Party.

22. The method as claimed in claim 19, wherein said Third Party Information relates to parcel delivery.

23. The method as claimed in claim 19, wherein said Third Party Information relates to parcel delivery, and includes "delivery name and address" and "reference number".

24. The method as claimed in claim 19, wherein said Third Party Information relates to medical records.

25. The method as claimed in claim 19, wherein said Third Party Information relates to credit information.

26. The method as claimed in claim 19, wherein said Third Party is a person and wherein said Third Party Information relates to information personal to said Third Party.

27. The method as claimed in claim 19, wherein said First Party and said Third Party are different sub-entities within an overall commonly-controlled entity.

28. The method as claimed in claim 19, wherein said First Party and said Third Party are different entities within an overall commonly-controlled company.

29. A method of authorizing the transfer of various types of information within a group of parties, said parties including a First Party, a Second Party, and a Third Party, said First party holding First Party Information, and said Third Party having an interest in Third Party Information held by said Second Party, said method including the following steps:
- transmitting a Request from said First Party to said Second Party, said Request being to allow said First Party to access said Third Party Information held by said Second Party, said Request from said First Party accompanied by said First Party Information;
- forwarding said First Party's Request from said Second Party to said Third Party, said Request accompanied by an Authorization Code authorized by said Second Party as well as said First Party Information, said forwarding being done via hand delivery to a physical address associated with said Third Party;
- authorizing said First Party's Request by said Third Party by the transfer of said Authorization Code from said Third Party to said First Party; and
- presenting said Authorization Code from said First Party to said Second Party, such that said First Party is authorized to obtain said Third Party Information from said Second Party.

30. A method of authorizing the transfer of various types of information within a group of parties, said parties including a First Party, a Second Party, and a Third Party, said First Party holding First Party Information, and said Third Party having an interest in Third Party Information held by said Second Party, said method including the following steps:
- identifying, by said Second Party, a physical address associated with said Third Party;
- transmitting a Request from said First Party to said Second Party, said Request being to allow said First Party to access said Third Party Information held by said Second Party, said Request from said First Party accompanied by said First Party Information;
- forwarding said First Party's Request from said Second Party to said Third Party, said Request accompanied by an Authorization Code authorized by said Second Party as well as said First Party Information, said forwarding being done via hand delivery to said physical address associated with said Third Party;

authorizing said First Party's Request by said Third Party by the transfer of said Authorization Code from said Third Party to said First Party; and presenting said Authorization Code from said First Party to said Second Party, such that said First Party is authorized to obtain said Third Party Information from said Second Party.

* * * * *